US012218369B2

(12) United States Patent
Matsuo et al.

(10) Patent No.: US 12,218,369 B2
(45) Date of Patent: Feb. 4, 2025

(54) BATTERY MODULE, BATTERY PACK, AND VEHICLE

(71) Applicant: KABUSHIKI KAISHA TOSHIBA, Tokyo (JP)

(72) Inventors: Tatsumi Matsuo, Kokubunji (JP); Ryousuke Kasaya, Sagamihara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 666 days.

(21) Appl. No.: 17/397,224

(22) Filed: Aug. 9, 2021

(65) Prior Publication Data

US 2021/0367301 A1 Nov. 25, 2021

Related U.S. Application Data

(63) Continuation of application No. PCT/JP2019/035210, filed on Sep. 6, 2019.

(30) Foreign Application Priority Data

May 17, 2019 (JP) ................................. 2019-094019

(51) Int. Cl.
*H01M 50/249* (2021.01)
*H01M 50/209* (2021.01)
(Continued)

(52) U.S. Cl.
CPC ....... *H01M 50/249* (2021.01); *H01M 50/209* (2021.01); *H01M 50/262* (2021.01);
(Continued)

(58) Field of Classification Search
CPC ............. H01M 50/262; H01M 50/289; H01M 50/271; H01M 50/258; H01M 50/249
See application file for complete search history.

(56) References Cited

U.S. PATENT DOCUMENTS 10,486,516 B2   11/2019   Yamanaka
2011/0076521 A1   3/2011   Shimizu et al.
(Continued)

FOREIGN PATENT DOCUMENTS

CN   105190934 A   12/2015
CN   107112469 A   8/2017
(Continued)

OTHER PUBLICATIONS

International Search Report issued Dec. 3, 2019 in PCT/JP2019/035210, filed on Sep. 6, 2019, 2 pages.
(Continued)

*Primary Examiner* — Nathanael T Zemui
(74) *Attorney, Agent, or Firm* — Maier & Maier, PLLC

(57) ABSTRACT

According to one embodiment, a battery module includes first to fourth batteries and a case in which these batteries are housed. In the case, a first partition wall partitions the first and the second batteries and partitions the third and fourth batteries in a first direction, and a second partition wall partitions the first and third batteries and partitions the second and fourth batteries in a second direction intersecting the first direction. A fastening member fastens case members to each other at an intersection of the above two partition walls. The case includes a rib protruding on a surface of at least one of the first and second partition walls.

8 Claims, 12 Drawing Sheets

(51) Int. Cl.
*H01M 50/262* (2021.01)
*H01M 50/271* (2021.01)
*H01M 50/289* (2021.01)
*H01M 50/543* (2021.01)

(52) U.S. Cl.
CPC ....... *H01M 50/271* (2021.01); *H01M 50/289* (2021.01); *H01M 50/543* (2021.01); *H01M 2220/00* (2013.01)

(56) References Cited

U.S. PATENT DOCUMENTS

| | | | |
|---|---|---|---|
| 2012/0270081 A1 | 10/2012 | Horii et al. | |
| 2014/0162114 A1* | 6/2014 | Suzuki | H01M 10/6555 429/163 |
| 2015/0333304 A1 | 11/2015 | Sekine | |
| 2017/0069888 A1 | 3/2017 | Toshiba | |
| 2017/0222272 A1* | 8/2017 | Takami | H01M 4/5825 |
| 2017/0263903 A1 | 9/2017 | Petrevski et al. | |
| 2018/0006280 A1* | 1/2018 | Ovadia | B65D 85/30 |
| 2019/0221797 A1 | 7/2019 | Nierhoff et al. | |
| 2020/0411816 A1 | 12/2020 | Yoneyama | |

FOREIGN PATENT DOCUMENTS

| | | |
|---|---|---|
| CN | 207368168 U | 5/2018 |
| CN | 109565010 A | 4/2019 |
| JP | 2011-076936 A | 4/2011 |
| JP | 2012-226995 A | 11/2012 |
| JP | 2018-506148 A | 3/2018 |
| JP | 2018-181749 A | 11/2018 |
| JP | 2018-202946 A | 12/2018 |
| JP | 2019-029175 A | 2/2019 |
| JP | WO 2019/031175 A1 | 2/2019 |
| KR | 10-2018-0083991 A | 7/2018 |
| WO | 2015/178456 A1 | 11/2015 |

OTHER PUBLICATIONS

Extended European Search Report issued Jun. 7, 2022, in corresponding European Patent Application No. 19929505.6, 6 pages.

* cited by examiner

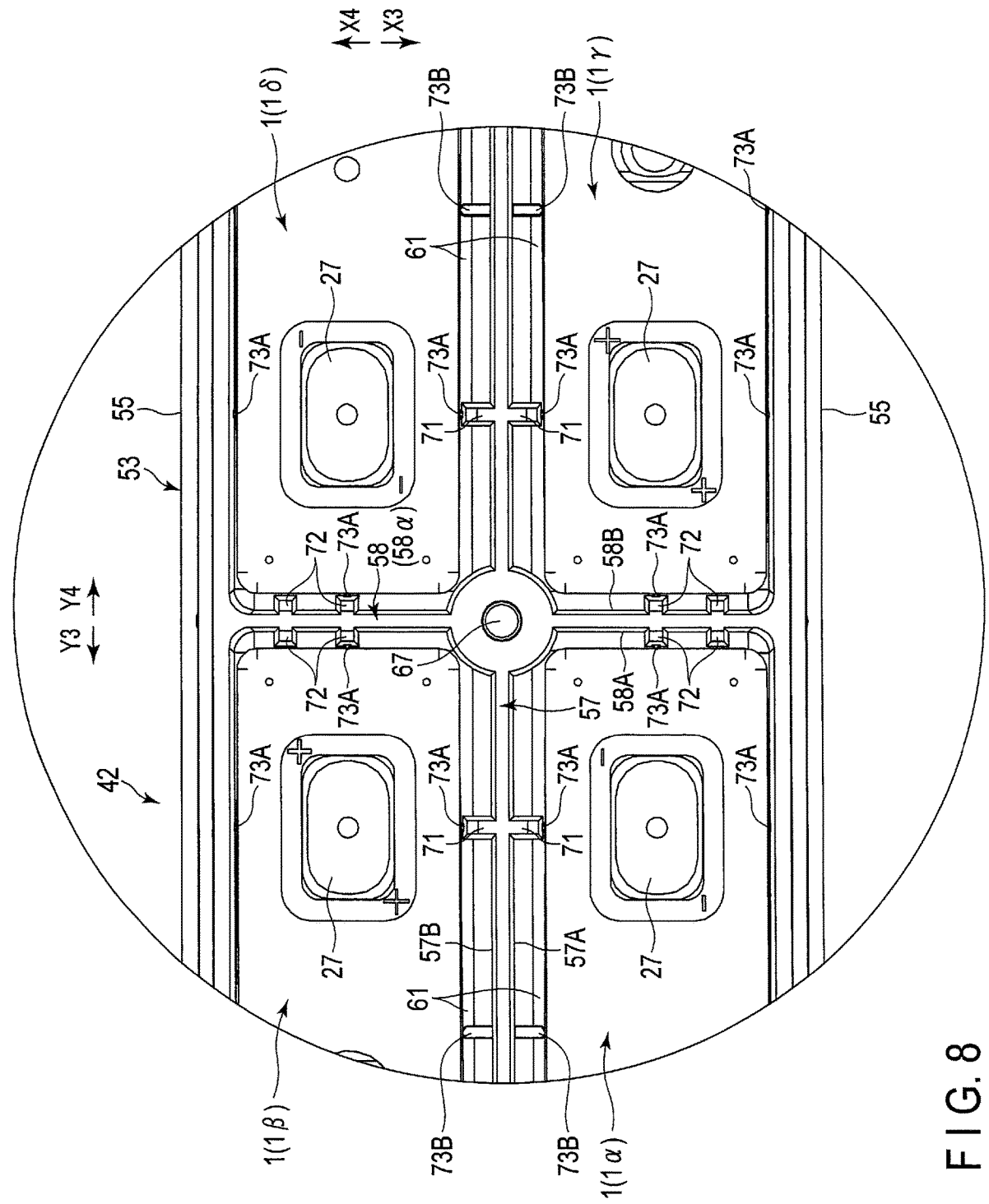
F I G. 8

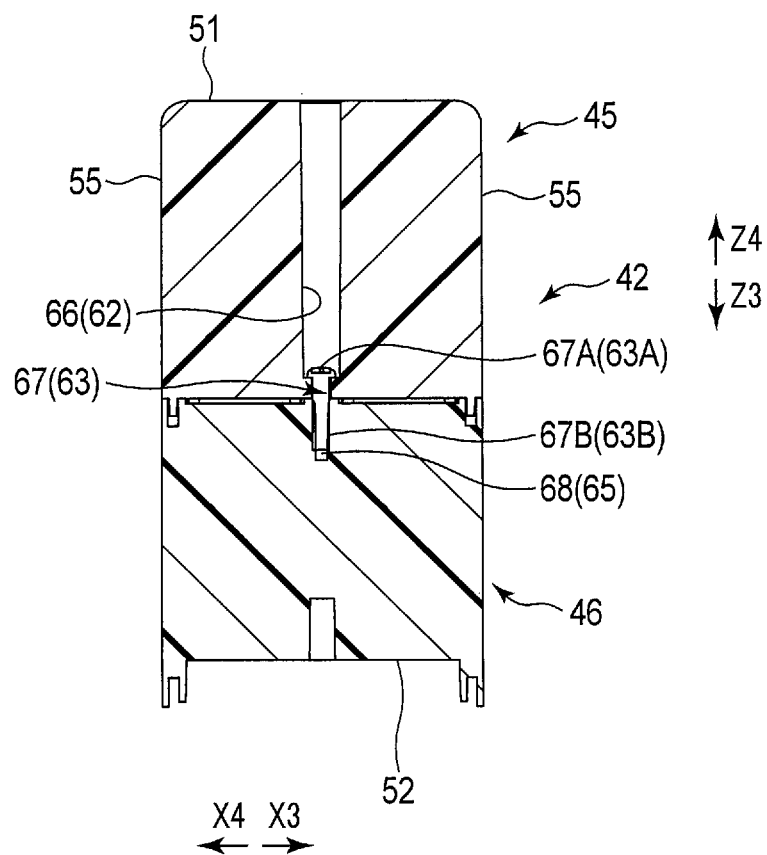
F I G. 9

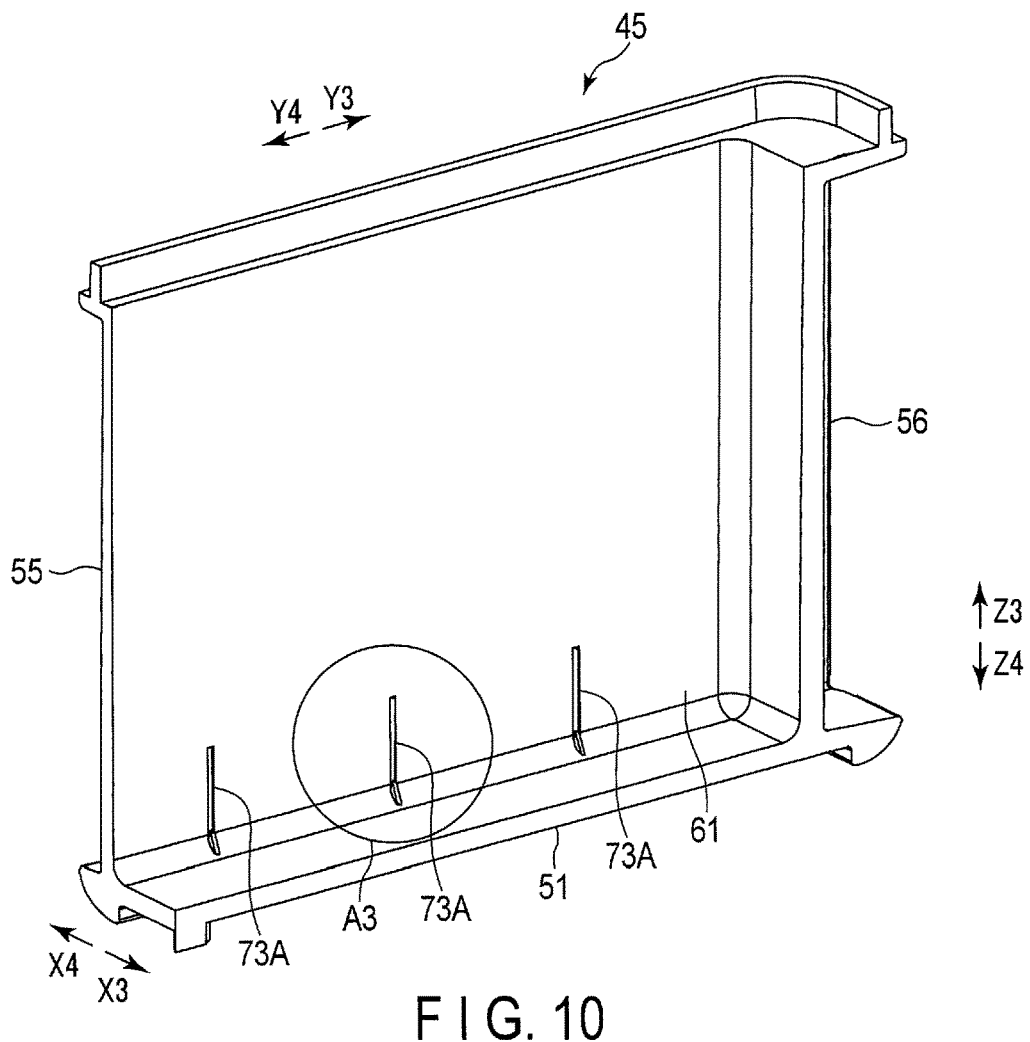
F I G. 10
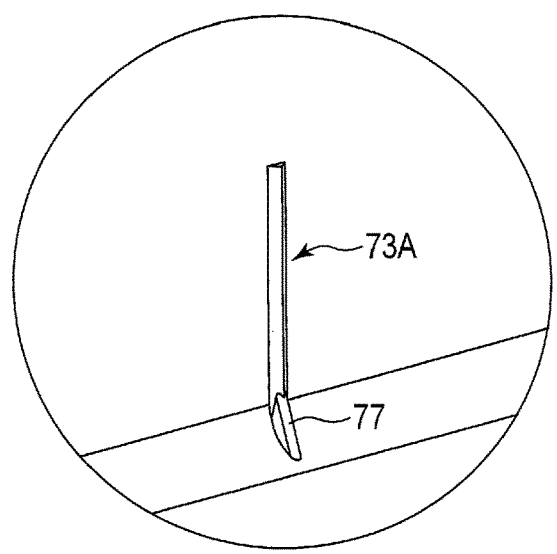
F I G. 11

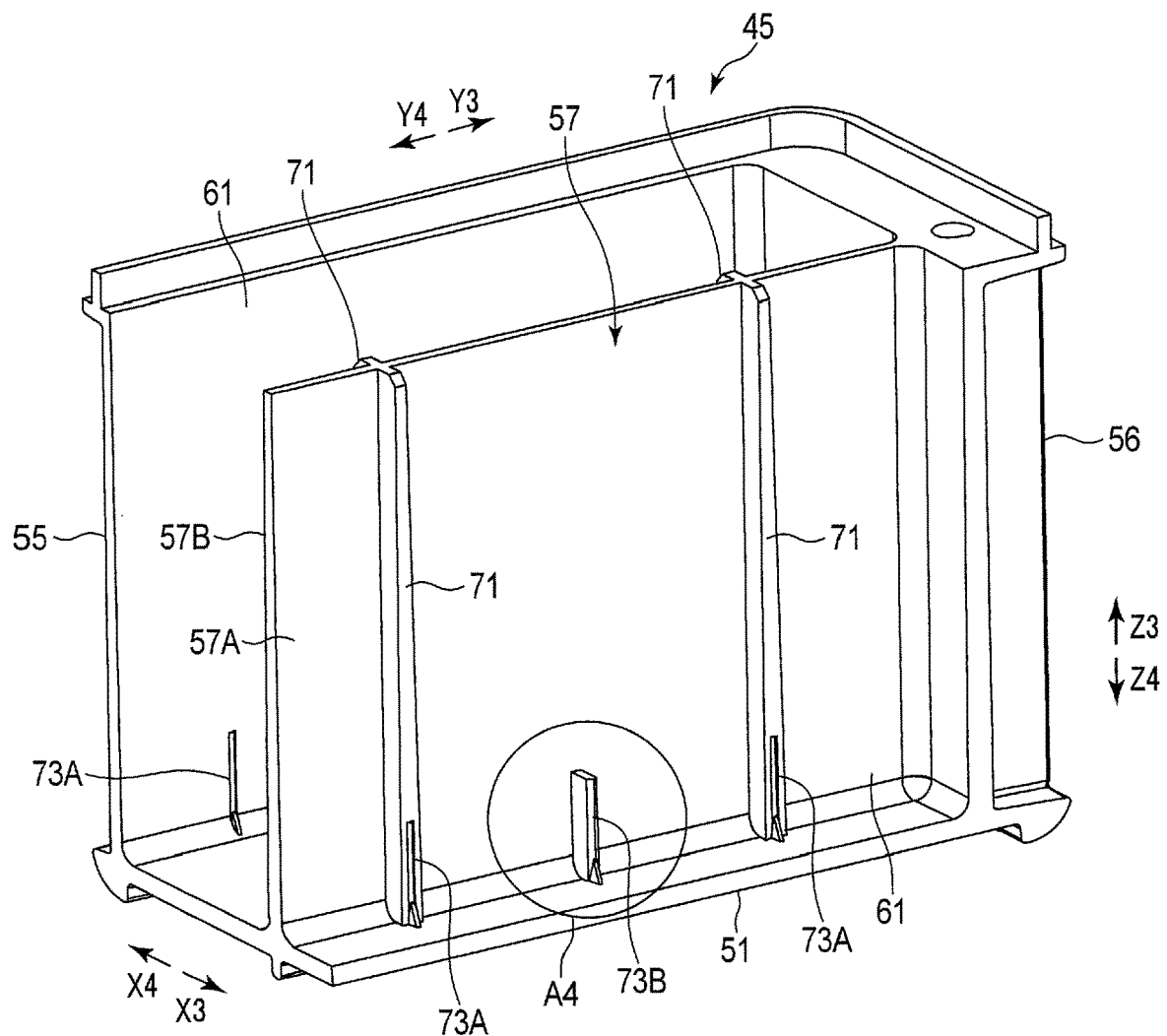
F I G. 12
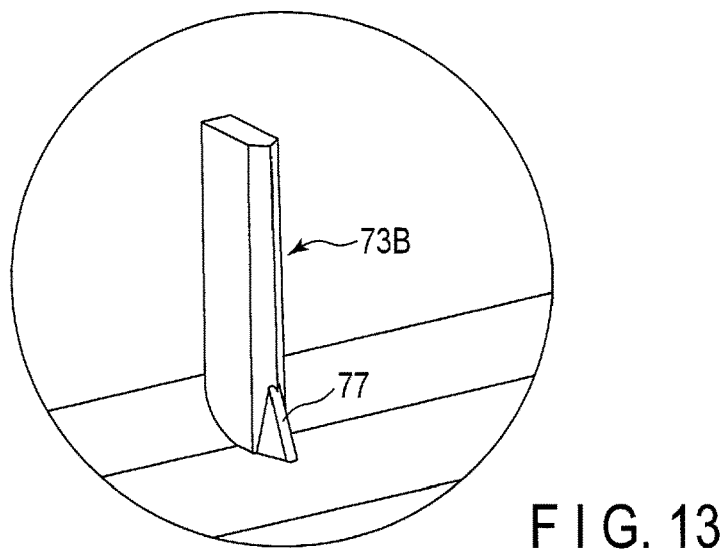
F I G. 13

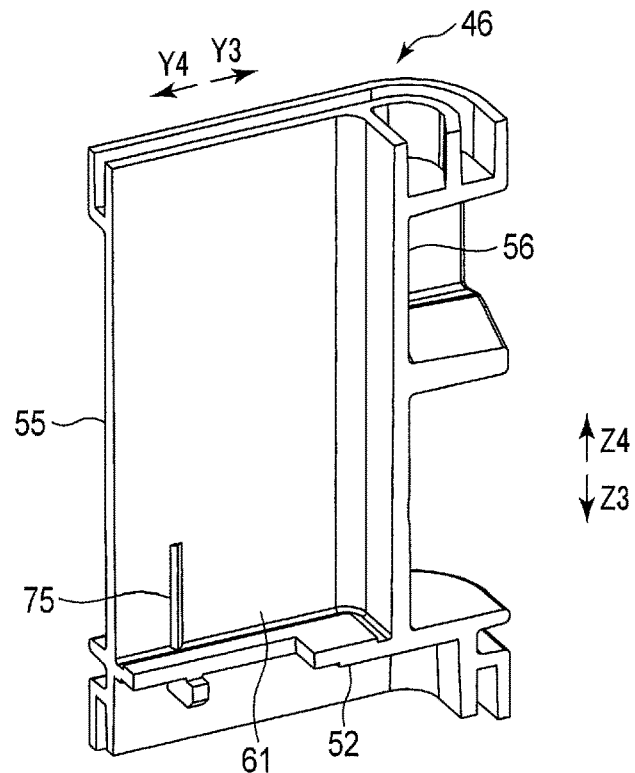
F I G. 14
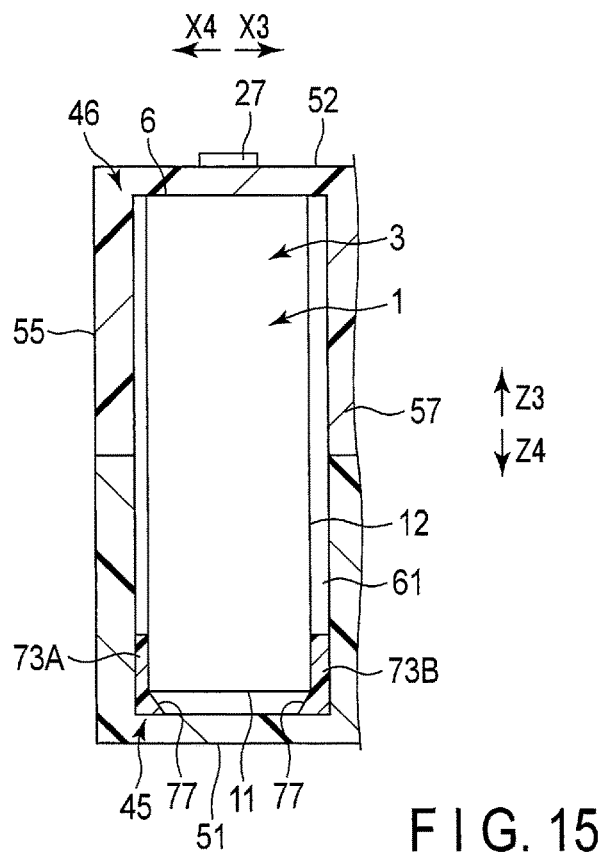
F I G. 15

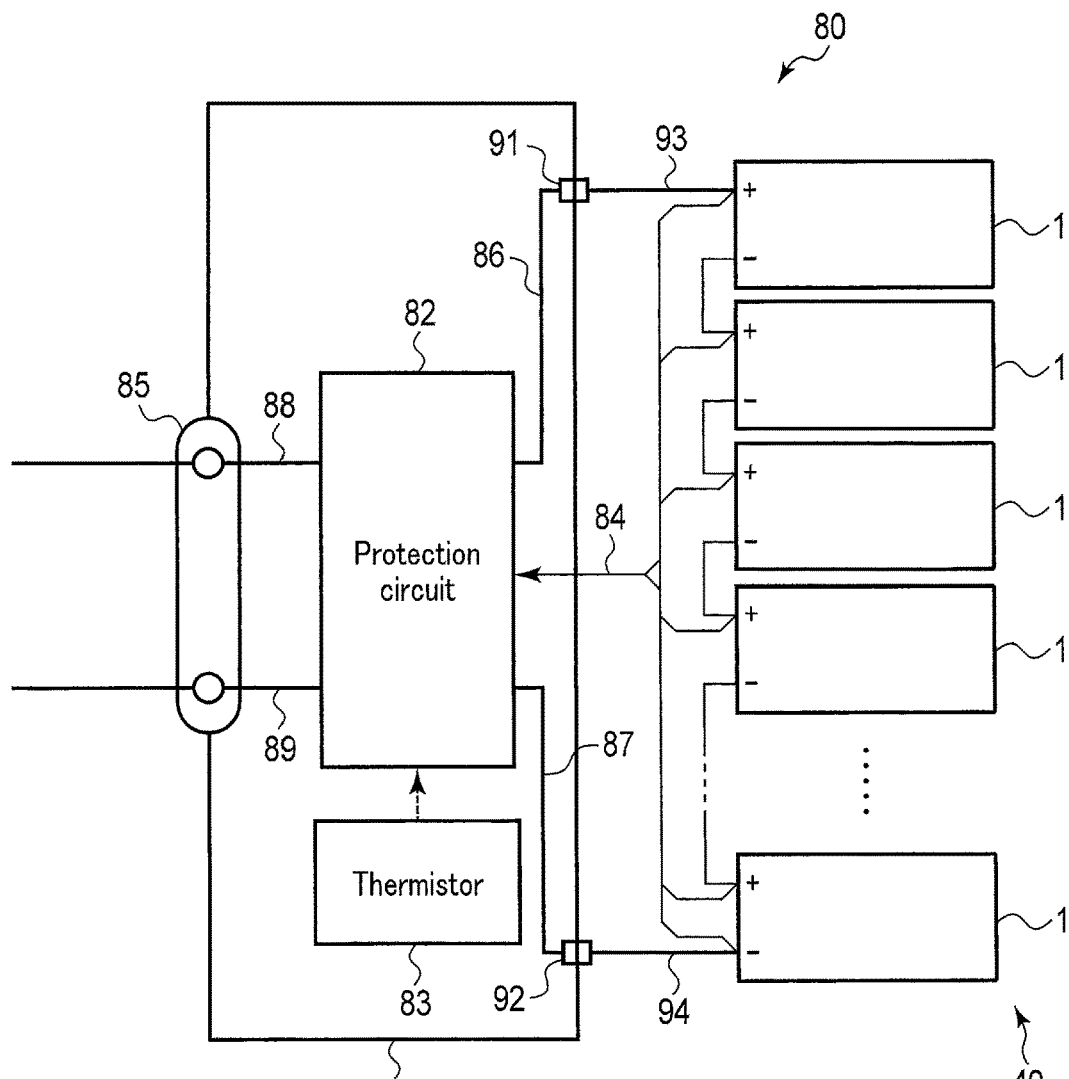
F I G. 16
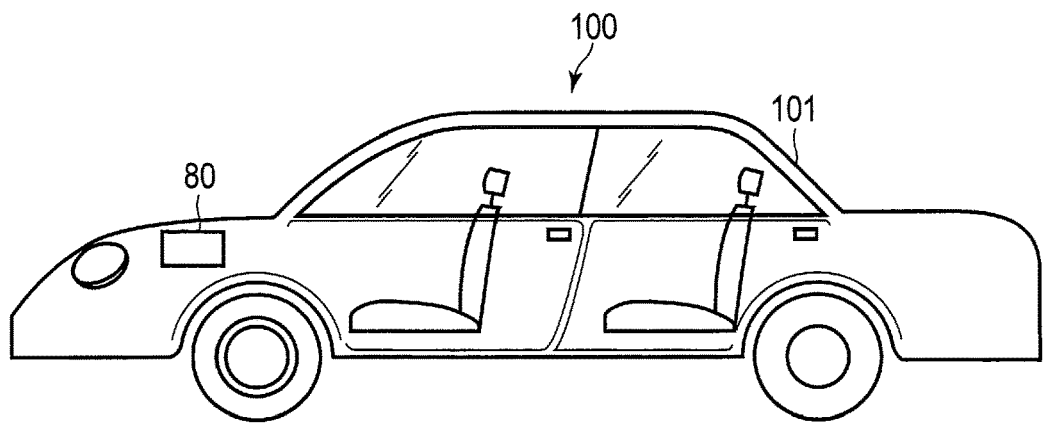
F I G. 17

BATTERY MODULE, BATTERY PACK, AND VEHICLE

CROSS-REFERENCE TO RELATED APPLICATIONS

This is a Continuation Application of PCT Application No. PCT/JP2019/035210, filed Sep. 6, 2019 and based upon and claiming the benefit of priority from prior Japanese Patent Application No. 2019-094019, filed May 17, 2019, the entire contents of which are incorporated herein by reference.

FIELD

Embodiments described herein relate generally to a battery module, a battery pack, and a vehicle.

BACKGROUND

Generally, in a battery module, a plurality of batteries are housed inside a case. The case is formed by coupling a plurality of case members. Such a battery module requires a plurality of case members forming a case to be firmly coupled, and each of a plurality of batteries to be firmly installed inside the case. A reduction in a weight of a case and a weight of an entire battery module is also required.

BRIEF DESCRIPTION OF THE DRAWINGS

FIG. 8 is an enlarged schematic view of range A1 of FIG. 6.

FIG. 9 is a cross-sectional view schematically showing an A2-A2 cross section of FIG. 7.

FIG. 10 is a perspective view schematically showing a partial range in a first case member of the battery module of FIG. 4.

FIG. 11 is an enlarged schematic view showing range A3 of FIG. 10.

FIG. 12 is a perspective view schematically showing a partial range different from that of FIG. 10 in the first case member of the battery module of FIG. 4.

FIG. 13 is a schematic view showing range A4 of FIG. 12.

FIG. 14 is a perspective view schematically showing a partial range of the second case member of the battery module of FIG. 4.

FIG. 15 is a schematic view showing one of eight spaces in the battery module of FIG. 4.

FIG. 16 is a schematic view showing an example of a battery pack using a battery module according to an embodiment.

FIG. 17 is a schematic view showing an example of a vehicle using the battery pack of the example, etc. of FIG. 16.

DETAILED DESCRIPTION

According to one embodiment, a battery module includes four or more batteries and a case in which the four or more batteries are housed. The four or more batteries include a first battery, a second battery adjacent to the first battery in a first direction, a third battery adjacent to the first battery in a second direction intersecting the first direction, and a fourth battery adjacent to the third battery in the first direction and adjacent to the second battery in the second direction. The case includes a first partition wall that partitions the first battery and the second battery and partitions the third battery and the fourth battery in the first direction, and a second partition wall that partitions the first battery and the third battery and partitions the second battery and the fourth battery in the second direction. The case includes a first case member, a second case member coupled to the first case member from one side in a third direction intersecting both the first direction and the second direction, and a fastening member fastening the first case member to the second case member at an intersection of the first partition wall and the second partition wall. The case includes at least one of a first rib protruding in the first direction on a surface of the first partition wall and a second rib protruding in the second direction on a surface of the second partition wall.

According to one embodiment, a battery pack including the above battery module is provided.

According to one embodiment, a vehicle including the above battery pack is provided.

Hereinafter, embodiments will be described with reference to drawings. A battery module according to an embodiment includes a plurality of batteries.

[Battery]

Figure 1:
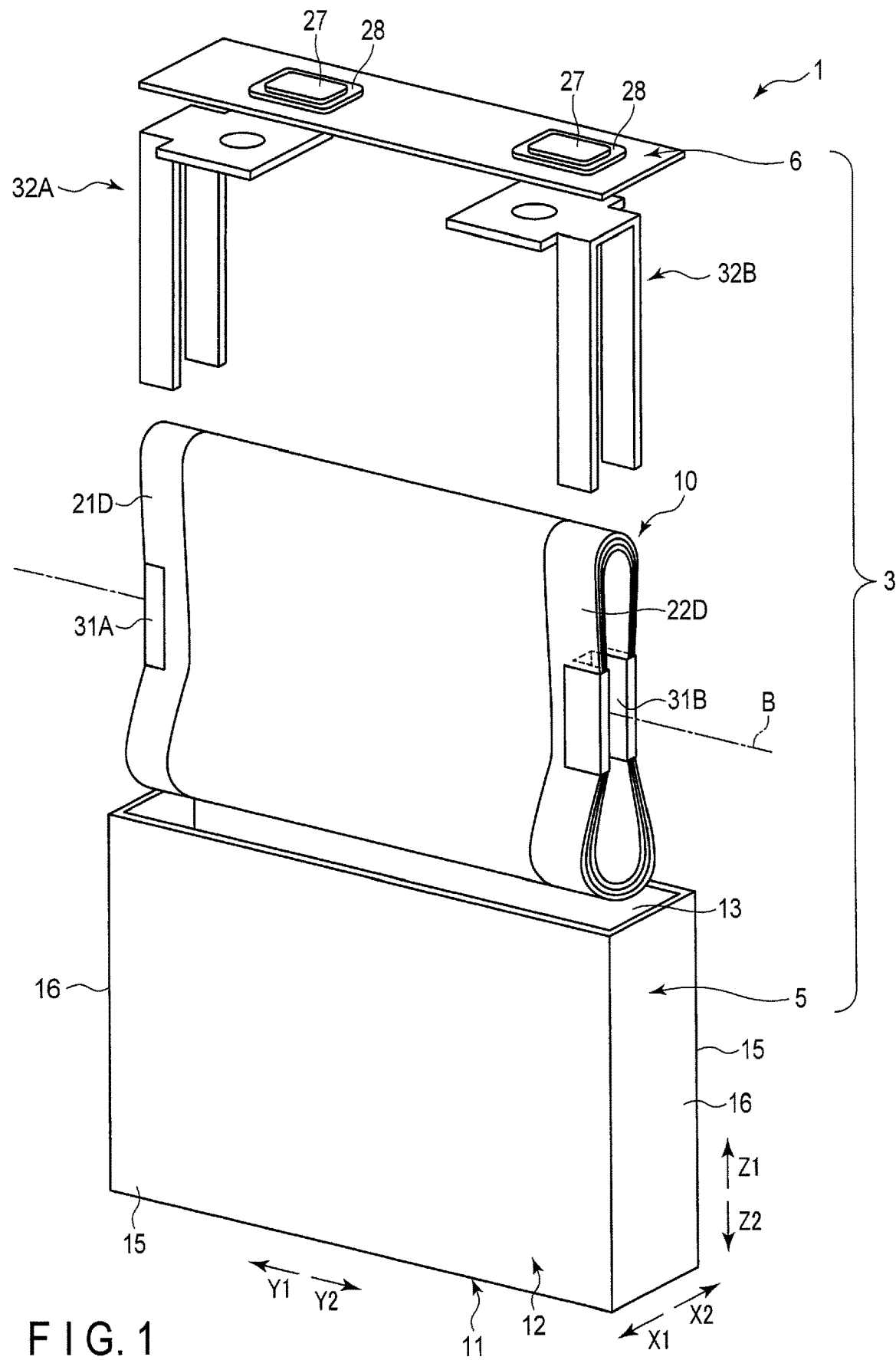
FIG. 1 is a perspective view schematically showing an example of a battery used for a battery module according to an embodiment in which the battery is disassembled into components.
Figure 2:
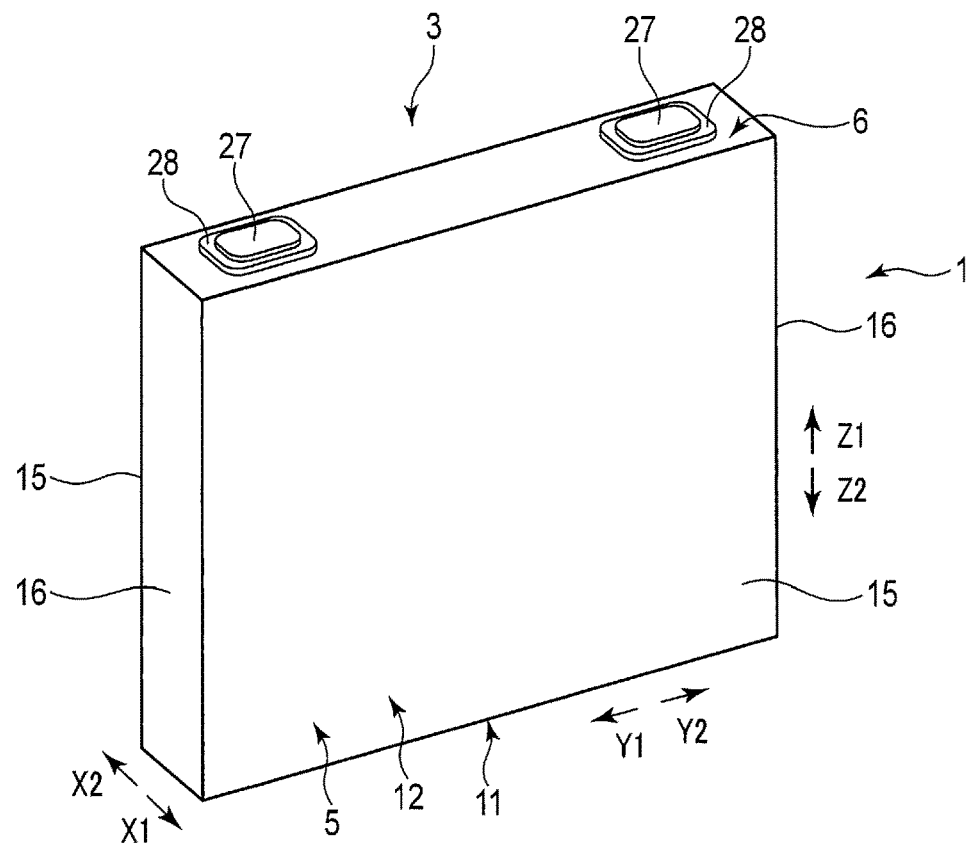
FIG. 2 is a perspective view schematically showing the battery of FIG. 1.

First, a single battery used in a battery module according to an embodiment will be described. FIGS. 1 and 2 show an example of a single battery 1 used in a battery module. The battery 1 is, for example, a secondary battery. FIG. 1 shows the battery 1 disassembled into components.

As shown in FIGS. 1 and 2, the battery 1 includes a container (outer portion) 3. The container 3 is made of a metal, such as aluminum, an aluminum alloy, steel, or stainless steel. An inner cavity 13 is formed inside the container 3. The battery 1 and the container 3 are each defined in terms of a depth direction (direction indicated by arrows X1 and X2), a lateral direction (direction indicated by arrows Y1 and Y2) intersecting (perpendicular to or substantially perpendicular to) the depth direction, and a height direction (direction indicated by arrows Z1 and Z2) intersecting (perpendicular to or substantially perpendicular to) both the depth direction and the lateral direction.

The container 3 includes a container body 5 and a lid member 6. In the example of FIG. 1, etc., the container body 5 has a bottom wall 11 and a peripheral wall 12, and is formed in a substantially rectangular parallelepiped shape with one surface opened. The bottom wall 11 is positioned on one side (arrow Z2 side) in the height direction with respect to the inner cavity 13. The peripheral wall 12 extends along a peripheral direction of the container 3, and an outer peripheral side of the inner cavity 13 is surrounded by the peripheral wall 12. The inner cavity 13 is open in the height direction toward a side (arrow Z1 side) opposite to a side in which the bottom wall 11 is positioned. In the battery 1 and container 3, a side on which the inner cavity (internal space) 13 is positioned with respect to the peripheral wall 12 is referred to as an inner peripheral side, and a side opposite to the inner peripheral side is referred to as an outer peripheral side.

The peripheral wall 12 includes two pairs of side walls 15 and 16. The pair of side walls (first side walls) face each other with the inner cavity 13 interposed therebetween in the depth direction. The pair of side walls (second side walls) 16 face each other with the inner cavity 13 interposed therebetween in the lateral direction. Each of the side walls 15 continuously extends in the lateral direction between the side walls 16. Each of the side walls 16 continuously extends in the depth direction between the side walls 15.

The lid member 6 is attached to the container body 5 in the opening of the inner cavity 13. The lid member 6 closes the opening of the inner cavity 13 and is attached to the peripheral wall 12 from the side opposite to the bottom wall 11 in the height direction. Therefore, the lid member 6 faces the bottom wall 11 with the inner cavity 13 interposed therebetween in the height direction. In the example of FIG. 1, etc., the lid member 6 is provided in a state in which the thickness direction of the lid member 6 corresponds to or substantially corresponds to the height direction of the battery 1.

In the example of FIG. 1, etc., the dimension in the depth direction between the pair of side walls 15 is much smaller than each of the dimension in the height direction between the bottom wall 11 and the lid member 6 and the dimension in the lateral direction between the pair of side walls 16. Therefore, the inner cavity 13 has a much smaller dimension in the depth direction than each of the dimension in the lateral direction and the dimension in the height direction. The container 3 is formed to have a uniform or substantially uniform thickness over the entire container 3. Therefore, the battery 1 and the container 3 each have a much smaller dimension in the depth direction than each of the dimension in the lateral direction and the dimension in the height direction.

Figure 3:
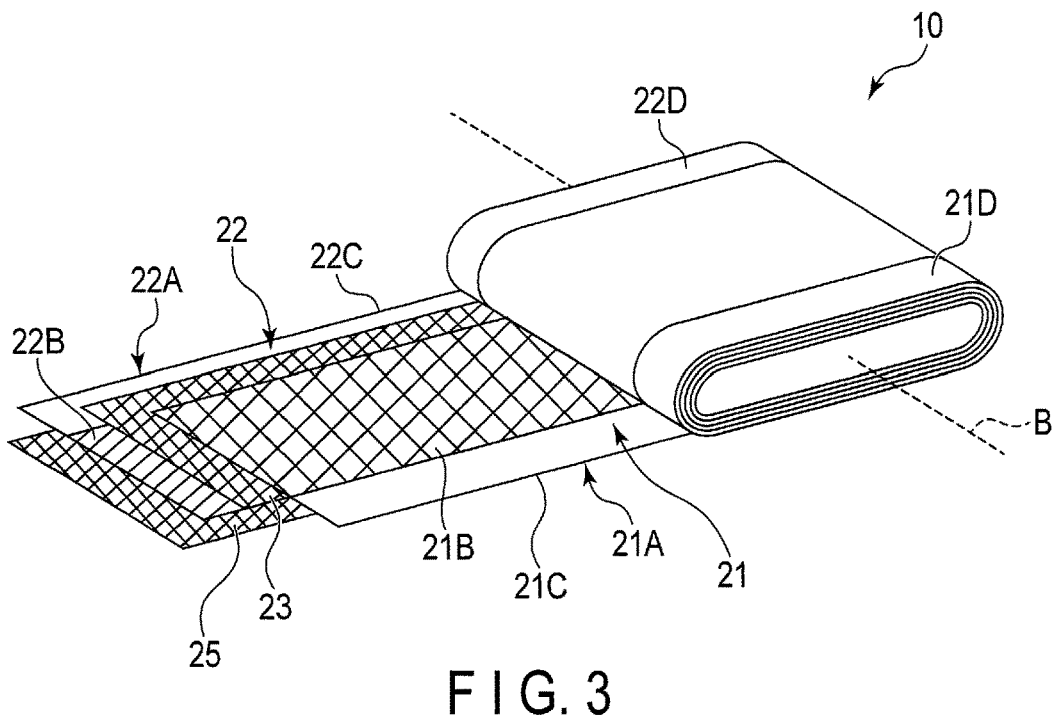
FIG. 3 is a schematic view showing a configuration example of an electrode group of the battery of FIG. 1.
Figure 4:
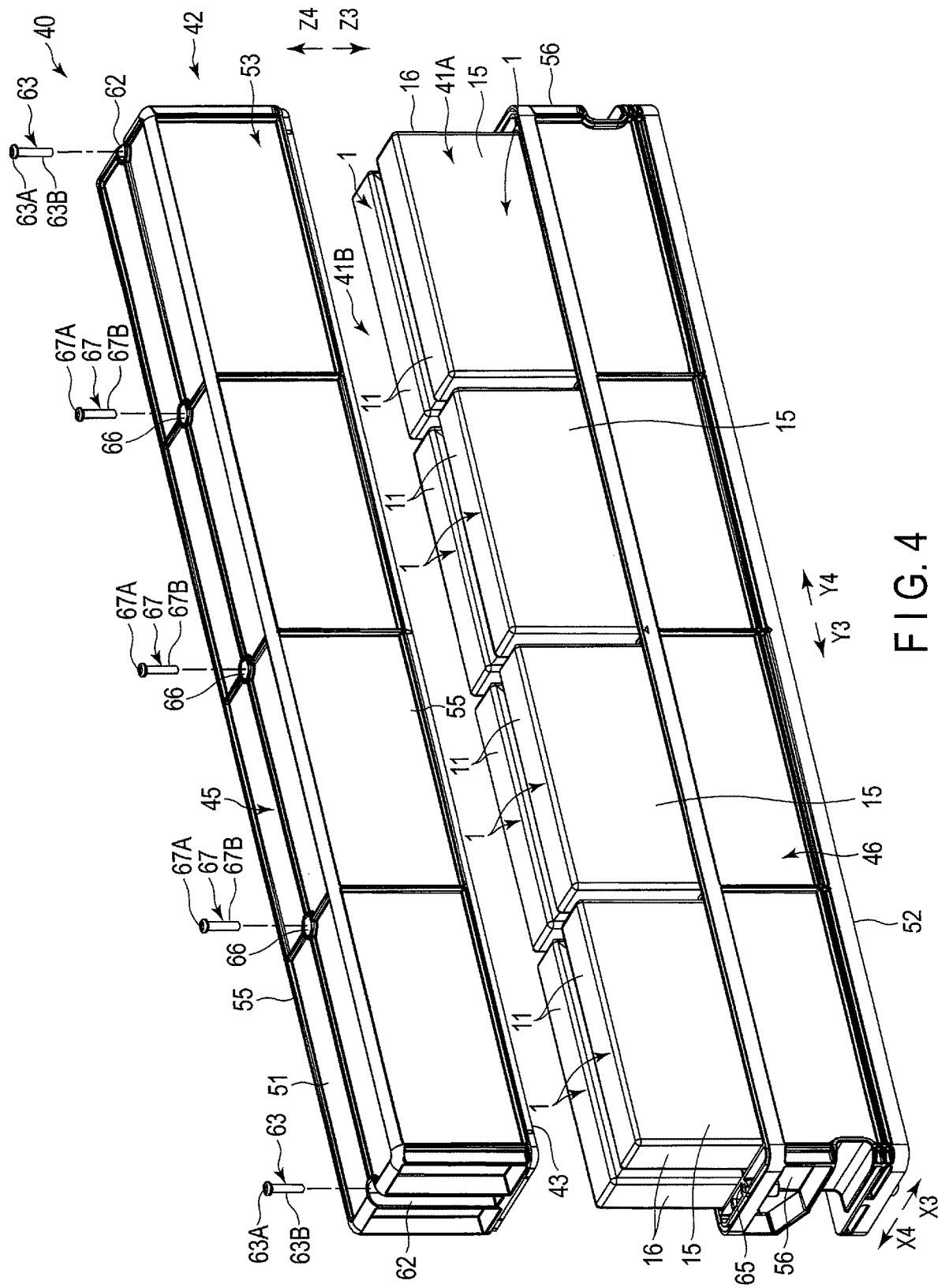
FIG. 4 is a perspective view schematically showing an example of a battery module according to a first embodiment in which the battery module is disassembled into components.

An electrode group 10 is housed in the inner cavity 13 of the container 3. FIG. 3 is a view to explain the configuration the electrode group 10. As shown in FIG. 3, the electrode group 10 is formed into, for example, a flat shape, and includes a positive electrode 21, a negative electrode 22, and separators 23 and 25. The positive electrode 21 includes a positive electrode current collecting foil 21A as a positive electrode current collector, and a positive electrode active material-containing layer 21B supported on a surface of the positive electrode current collecting foil 21A. The positive electrode current collecting foil 21A is an aluminum foil, an aluminum alloy foil, or the like, and has a thickness of 10 μm to 20 μm. A slurry containing a positive electrode active material, a binder, and an electro-conductive agent is applied to the positive electrode current collecting foil 21A. Examples of the positive electrode active material include, but are not limited to, an oxide, a sulfide, a polymer, etc., that can occlude and release lithium. From the point of view of obtaining a high positive electrode electric potential, it is preferable to use a lithium manganese composite oxide, a lithium nickel composite oxide, a lithium cobalt composite oxide, a lithium iron phosphate, etc., as the positive electrode active material.

The negative electrode 22 includes a negative electrode current collecting foil 22A as a negative electrode current collector, and a negative electrode active material-containing layer 22B supported on a surface of the negative electrode current collecting foil 22A. The negative electrode current collecting foil 22A is an aluminum foil, an aluminum alloy foil, a copper foil, or the like, and has a thickness of 10 μm to 20 μm. A slurry containing a negative electrode active material, a binder, and an electro-conductive agent is applied to the negative electrode current collecting foil 22A. Examples of the negative electrode active material include, but are not limited to, a metal oxide, a metal sulfide, a metal nitride, a carbon material, etc., that can occlude and release lithium. The negative electrode active material is preferably a material that occludes and releases lithium ions at a noble electric potential of 0.4 V or more in comparison to an electric potential of metal lithium, that is, a material that occludes and releases lithium ions at a noble electric potential of 0.4 V (vs. Li$^+$/Li) or more. The use of a negative electrode active material which occludes and releases lithium ions at such a noble electric potential inhibits an alloy reaction between aluminum or an aluminum alloy and lithium, and this allows the use of aluminum or an aluminum alloy for the negative electrode current collecting foil 22A and constituent members relating to the negative electrode 22. Examples of the negative electrode active material which occludes and releases lithium ions at the noble electric potential of 0.4 V (vs. Li$^+$/Li) or more include a titanium oxide, a lithium titanium composite oxide such as lithium titanate, a tungsten oxide, an amorphous tin oxide, a niobium titanium composite oxide, a tin silicon oxidate, a silicon oxide, etc., and it is particularly preferable to use a lithium titanium composite oxide as the negative electrode active material. When a carbon material which occludes and releases lithium ions is used as the negative electrode active material, a copper foil is preferably used as the negative electrode current collecting foil 22A. A carbon material used as the negative electrode active material occludes and releases lithium ions at a noble electric potential of about 0 V (vs. Li$^+$/Li).

It is desirable that an aluminum alloy used for the positive electrode current collecting foil 21A and the negative electrode current collecting foil 22A include one or two or more elements selected from Mg, Ti, Zn, Mn, Fe, Cu, and Si. A purity of aluminum and an aluminum alloy may be set to 98% by weight or more, and preferably 99.99% by weight or more. Furthermore, pure aluminum with a purity of 100% is usable as a material for the positive electrode current collector and/or the negative electrode current collector. A content of a transition metal such as nickel, chromium, etc., contained in aluminum and an aluminum alloy is preferably 100 wt. ppm or less (including 0 wt. ppm).

In the positive electrode current collecting foil 21A, a long-side edge 21C as one long-side edge, and its neighboring region, form the positive electrode current collecting tab 21D. In the example of FIG. 2, the positive electrode current collecting tab 21D is formed over the entire length of the long-side edge 21C. In the positive electrode current collecting tab 21D, the positive electrode active material-containing layer 21B is not supported on the surface of the positive electrode current collecting foil 21A. The positive electrode current collecting foil 21A includes a positive electrode current collecting tab 21D as a portion not supporting the positive electrode active material-containing layer 21B. In the negative electrode current collecting foil 22A, a long-side edge 22C as one long-side edge, and its neighboring region, form the negative electrode current collecting tab 22D. In the example of FIG. 2, the negative electrode current collecting tab 22D is formed over the entire length of the long-side edge 22C. In the negative electrode current collecting tab 22D, the negative electrode active material-containing layer 22B is not supported on the surface of the negative electrode current collecting foil 22A. Therefore, the negative electrode current collecting foil 22A includes the negative electrode current collecting tab 22D as a portion where the negative electrode active material-containing layer 22B is not supported.

Each of the separators 23 and 25 is made of a material having electrical insulation properties, and electrically insulates the positive electrode 21 from the negative electrode 22. Each of the separators 23 and 25 may be a separate sheet, etc. from the positive electrode 21 and the negative electrode 22, or may be integrated with one of the positive electrode 21 and the negative electrode 22. The separators 23 and 25 may be made of an organic material, an inorganic material, or a mixture of an organic material and an inorganic material. Examples of an organic material that forms the separators 23 and 25 include engineering plastic and super engineering plastic. Examples of engineering plastics include polyamide, polyacetal, polybutylene terephthalate, polyethylene terephthalate, syndiotactic polystyrene, polycarbonate, polyamide imide, polyvinyl alcohol, polyvinylidene fluoride, modified polyphenylene ether, etc. Examples of super engineering plastics include polyphenylene sulfide, polyetheretherketone, liquid crystal polymer, polyvinylidene fluoride, polytetrafluoroethylene (PTFE), polyethernitrile, polysulfone, polyacrylate, polyetherimide, thermoplastic polyimide, etc. Examples of an inorganic material that forms the separators 23 and 25 include oxides (for example, aluminum oxide, silicon dioxide, magnesium oxide, phosphorus oxide, calcium oxide, iron oxide, and titanium oxide), and nitrides (for example, boron nitride, aluminum nitride, silicon nitride, and barium nitride), etc.

In the electrode group 10, the positive electrode 21, the negative electrode 22, and the separators 23 and 25 are wound around winding axis B into a flat shape in a condition in which each of the separators 23 and 25 is interposed between the positive electrode active material-containing layer 21B and the negative electrode active material-containing layer 22B. The positive electrode 21, the separator 23, the negative electrode 22, and the separator 25 are wound in a condition in which they are stacked together in this order. In the electrode group 10, the positive electrode current collecting tab 21D of the positive electrode current collecting foil 21A protrudes from the negative electrode 22 and the separators 23 and 25 toward one side in the direction along the winding axis B. The negative electrode current collecting tab 22D of the negative electrode current collecting foil 22A protrudes from the positive electrode 21 and the separators 23 and 25 toward a side opposite to the side toward which the positive electrode current collecting tab 21D protrudes in the direction along the winding axis B.

The electrode group 10 is arranged such that the winding axis B is parallel or substantially parallel to the lateral direction of the battery 1. Thus, in the inner cavity 13 of the container 3, the positive electrode current collecting tab 21D protrudes from the negative electrode 22 and the separators 23 and 25 toward one side in the lateral direction. The negative electrode current collecting tab 22D protrudes from the positive electrode 21 and the separators 23 and 25 to the side opposite to the side toward which the positive electrode current collecting tab 21D protrudes in the lateral direction.

The electrode group 10 does not need to have a wound structure in which the positive electrode, the negative electrode, and the separators are wound. In an example, the electrode group 10 has a stack structure in which a plurality of positive electrodes and a plurality of negative electrodes are alternately stacked, and a separator is provided between the positive electrode and the negative electrode. In this case also, in the electrode group 10, the positive electrode current collecting tab protrudes from the negative electrode toward one side in the lateral direction of the battery 1 (container 3). In the electrode group 10, the negative electrode current collecting tab protrudes from the positive electrode toward a side opposite to the side toward which the positive electrode current collecting tab protrudes in the lateral direction of the battery 1.

In an example, inside the inner cavity 13, the electrode group 10 is impregnated with an electrolytic solution (not shown). As the electrolytic solution, a nonaqueous electrolytic solution is used, and for example, a nonaqueous electrolytic solution prepared by dissolving an electrolyte in an organic solvent is used. In this case, examples of the electrolyte dissolved in the organic solvent include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonylimide [$LiN(CF_3SO_2)_2$], etc., and mixtures thereof. Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methyl ethyl carbonate (MEC); cyclic ethers such as tetrahydrofuran (THF), 2-methyltetrahydrofuran (2MeTHF) and dioxolane (DOX); linear ethers such as dimethoxyethane (DME) and diethoxyethane (DEE); and γ-Butyrolactone (GBL), acetonitrile (AN), and sulfolane (SL). These organic solvents are used alone or as a mixed solvent.

In an example, as the nonaqueous electrolyte, a gel nonaqueous electrolyte in which a nonaqueous electrolytic solution and a polymer material are combined is used instead of the electrolytic solution. In this case, the above-described electrolyte and organic solvent are used. Examples of the polymer material include polyvinylidene fluoride (PVdF), polyacrylonitrile (PAN), and polyethylene oxide (PEO).

In an example, instead of the electrolytic solution, a solid electrolyte such as a high-polymer solid electrolyte, an inorganic solid electrolyte, etc., is provided as a nonaqueous electrolyte. In this case, the electrode group 10 may not be provided with the separators 23 and 25. In the electrode group 10, instead of the separators 23 and 25, a solid electrolyte is interposed between the positive electrode 21 and the negative electrode 22. Thus, in this example, the solid electrolyte achieves electrical isolation between the positive electrode 21 and the negative electrode 22. In an example, an aqueous electrolyte containing an aqueous solvent may be used as the electrolyte instead of the nonaqueous electrolyte.

In the battery 1, a pair of electrode terminals 27 are attached to an outer surface of the lid member 6, that is, a surface of the lid member 6 facing the side opposite to the bottom wall 11. One of the electrode terminals 27 is a positive electrode terminal of the battery 1 while the other is a negative electrode terminal. Each of the electrode terminals 27 is attached to the outer surface of the lid member 6 in a state of being exposed to the outside. In the battery 1, the electrode terminals 27 are separated from each other in the lateral direction. The center position of the battery 1 in the lateral direction is located between the electrode terminals 27. Each of the electrode terminals 27 is made of an electro-conductive material, for example, any one of aluminum, copper, stainless steel, and the like.

A pair of insulating members 28 made of an electrically insulating material are provided on the outer surface of the lid member 6. Each of the insulating members 28 is interposed between the outer surface of the lid member 6 and a corresponding one of the electrode terminals 27, and electrically insulates the corresponding one of the electrode terminals 27 from the container 3. The insulating members 28 are arranged on sides opposite to each other with the center position of the battery 1 interposed therebetween in the lateral direction.

The positive electrode current collecting tab 21D of the electrode group 10 is bundled by welding such as ultrasonic welding. The bundle of the positive electrode current collecting tab 21D is electrically connected to a corresponding one (positive electrode terminal) of the electrode terminals 27 via one or more positive electrode leads including a positive electrode backup lead 31A, a positive electrode lead 32A, and the like. At this time, the connection between the positive electrode current collecting tab 21D and the positive electrode lead, the connection between the positive electrode leads, and the connection between the positive electrode lead and the positive electrode terminal are made by welding such as ultrasonic welding. Here, the positive electrode lead is made of a conductive metal. The positive electrode current collecting tab 21D and the positive electrode lead are electrically insulated from the container 3 by an insulating member (not shown) or the like.

Similarly, the negative electrode current collecting tab 22D of the electrode group 10 is bundled by welding such as ultrasonic welding. The bundle of the negative electrode current collecting tab 22D is electrically connected to a corresponding one (negative electrode terminal) of the electrode terminals 27 via one or more negative electrode leads including a negative electrode backup lead 31B, a negative electrode lead 32B, and the like. At this time, the connection between the negative electrode current collecting tab and the negative electrode lead, the connection between the negative electrode leads, and the connection between the negative electrode lead and the negative electrode terminal are made by welding such as ultrasonic welding. Here, the negative electrode lead is made of a conductive metal. The negative electrode current collecting tab and the negative electrode lead are electrically insulated from the container 3 by an insulating member (not shown) or the like.

In an example, the lid member 6 may be provided with a gas release valve and a liquid inlet (neither shown in FIGS. 1 to 3). When the lid member 6 is provided with a liquid inlet, a sealing plate (not shown in FIGS. 1 to 3) for closing the liquid inlet is welded to the outer surface of the lid member 6.

In the above-described example, etc., a single electrode group 10 is housed in the inner cavity 13 of the container 3, but it is not limited thereto. In an example, a plurality of electrode groups may be housed in the inner cavity 13 of the container 3.

[Battery Module]

Next, a battery module including a plurality of batteries such as the above-described battery 1 will be described.

First Embodiment

Figure 5:
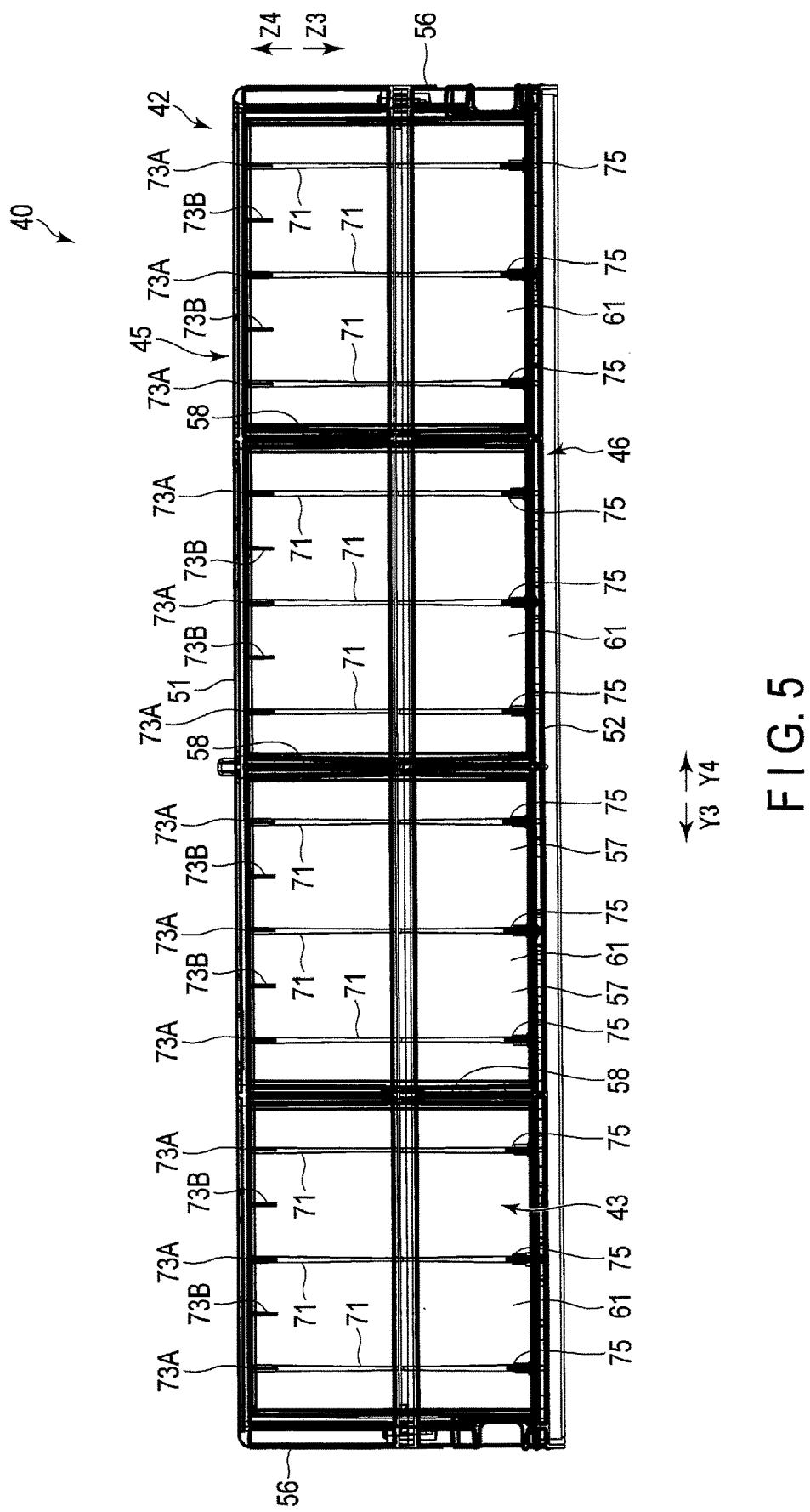
FIG. 5 is a schematic view showing the battery module of FIG. 4 with a partition wall (first partition wall) viewed from one side in a first direction.
Figure 6:
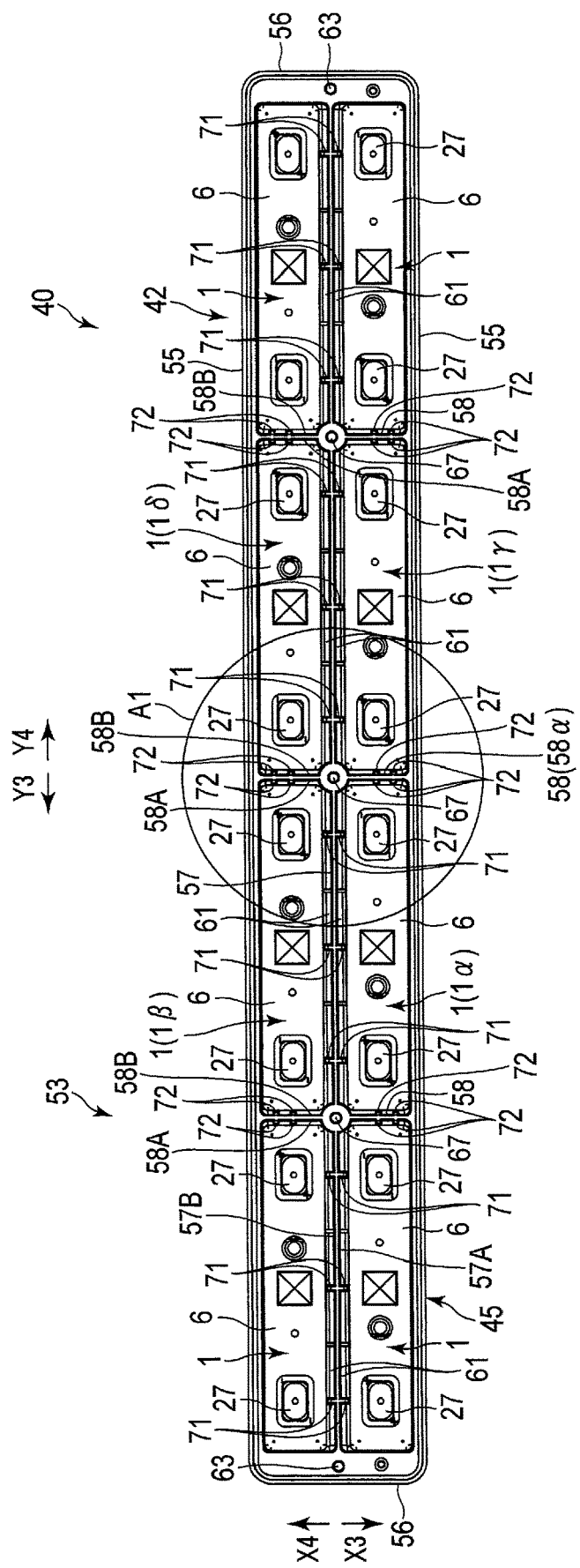
FIG. 6 is a schematic view showing the battery module of FIG. 4 as viewed from a side where a case top wall is positioned in a third direction, with the second case member being omitted.
Figure 7:
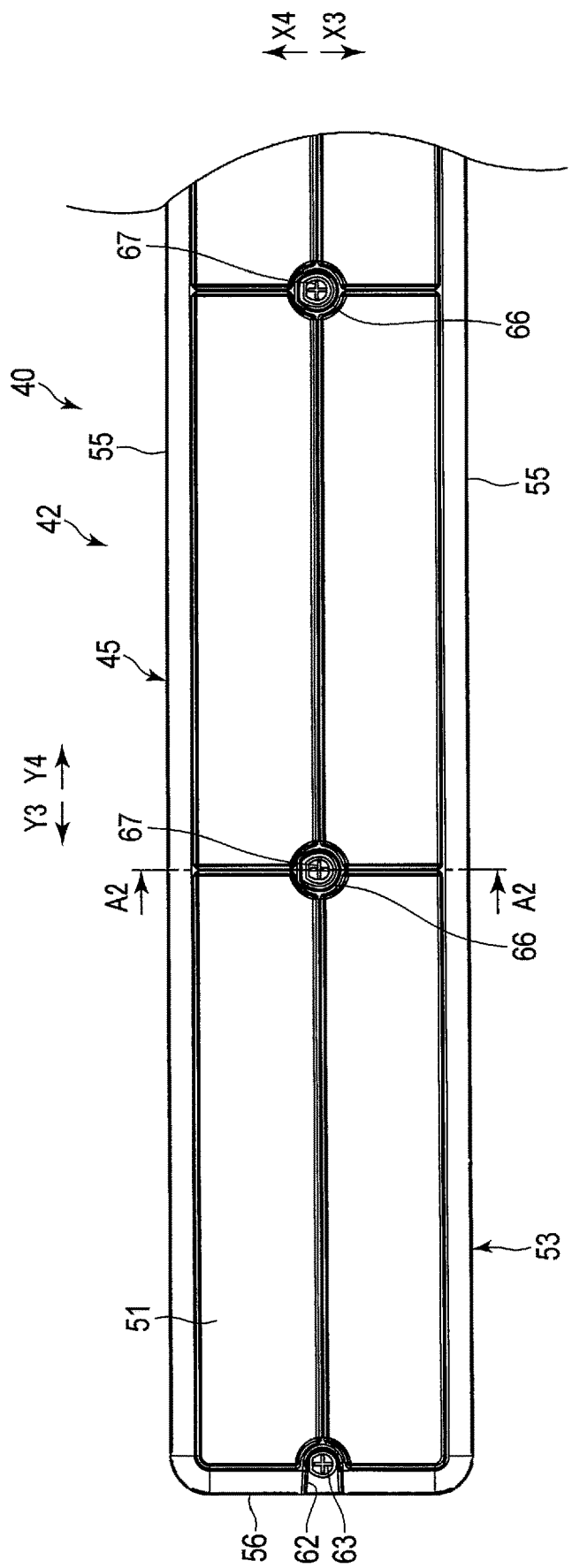
FIG. 7 is a schematic view showing the battery module of FIG. 4 as viewed from a side where a case bottom wall is positioned in the third direction.

First, a battery module according to the first embodiment will be described. FIGS. 4 to 7 show an example of a battery module 40 of the first embodiment. As shown in FIGS. 4 to 7, etc., the battery module 40 is defined in terms of a first direction (direction indicated by arrows X3 and X4), a second direction (direction indicated by arrows Y3 and Y4) intersecting (perpendicular or substantially perpendicular to) the first direction, and a third direction (direction indicated by arrows Z3 and Z4) intersecting (perpendicular or substantially perpendicular to) both the first direction and the second direction. Here, FIG. 5 illustrates a state viewed from one side in the first direction, and FIGS. 6 and 7 illustrate a state viewed from one side in the third direction.

In the battery module 40, four or more of the aforementioned batteries 1 are provided, and in an example of FIGS. 4 to 7, eight batteries 1 are provided. In the battery module 40, two (the first number of) battery rows 41A and 41B are formed. Each of the battery rows 41A and 41B includes four (the second number of) batteries 1 arrayed along the second direction. Therefore, when the number of battery rows (41A, 41B) formed in the battery module 40 is defined as the first number while the number of batteries 1 arrayed in each battery row (41A, 41B) is defined as the second number, the second number is larger than the first number. The battery rows 41A and 41B are adjacent to each other in the first direction. The battery rows 41A and 41B are not deviated or are rarely deviated from each other in the second direction and the third direction.

In each of the battery rows 41A and 41B, each of the batteries 1 is arranged in a state in which the lateral direction is along an array direction (second direction), that is, in a state in which the lateral direction corresponds to or substantially corresponds to the array direction. In each of the battery rows 41A and 41B, each of the batteries 1 is arranged in a state in which the depth direction corresponds to or substantially corresponds to the first direction, and the height direction corresponds to or substantially corresponds to the third direction. That is, in each of the battery rows 41A and 41B, each of the batteries 1 is arranged in a state in which the depth direction is along the first direction and the height direction is along the third direction. In each of the battery rows 41A and 41B, the batteries 1 are not deviated or are rarely deviated from each other in the first direction and the third direction.

The battery module 40 includes a case 42. In the battery module 40, each of the batteries 1 is housed in a storage cavity 43 inside the case 42. In the storage cavity 43, as described above, a plurality of (eight in the example of FIGS. 4 to 7) batteries 1 are provided, and a plurality of (two in the example of FIGS. 4 to 7) battery rows 41A and 41B are formed. The case 42 includes a first case member 45 and a second case member 46. The first case member 45 and the second case member 46 are each made of an electrically insulating material such as resin. The second case member 46 is coupled to the first case member 45 from one side (arrow Z3 side) in the third direction.

The case 42 including the case members 45 and 46 has a case bottom wall 51, a case top wall 52, and a case peripheral wall 53, and is formed to have a substantially rectangular parallelepiped shape. The case bottom wall 51 is positioned on one side (arrow Z4 side) in the third direction with respect to the storage cavity 43 (the container 3 of each battery 1). The case top wall 52 is positioned on the side opposite to the side where the case bottom wall 51 is positioned with respect to the storage cavity 43 (the container 3 of each battery 1) in the third direction. Therefore, the storage cavity 43 is formed between the case bottom wall 51 and the case top wall 52 in the third direction.

In each of the batteries 1, the outer surface of the bottom wall 11 faces the side where the case bottom wall 51 is positioned in the third direction. In each of the batteries 1, the outer surface of the lid member 6 faces the side where the case top wall 52 is positioned in the third direction. Therefore, the outer surface of the lid member 6 of each of the batteries 1 faces the side where the second case member 46 is positioned with respect to the first case member 45. The case peripheral wall 53 extends along the peripheral direction of the case 42 (battery module 40) between the case bottom wall 51 and the case top wall 52. The outer peripheral side of the storage cavity 43 is surrounded by the case peripheral wall 53. In each of the battery module 40 and the case 42, the side where the storage cavity (internal space) 43 is positioned with respect to the case peripheral wall 53 is defined as an inner peripheral side, and a side opposite to the inner peripheral side is defined as an outer peripheral side.

In the case 42, the case bottom wall 51 is formed by the first case member 45, and the case top wall 52 is formed by the second case member 46. The case peripheral wall 53 is formed by both the first case member 45 and the second case member 46. In the case peripheral wall 53, the case members 45 and 46 are brought into contact with each other at or near the central position in the third direction. In the case peripheral wall 53, a boundary portion between the case members 45 and 46 is formed along the peripheral direction of the case 42. In the case peripheral wall 53, the boundary portion between the case members 45 and 46 is formed over the entire periphery or substantially the entire periphery of the case 42 in the peripheral direction. FIG. 6 shows a state viewed from a side where the case top wall 52 is positioned in the third direction, with the second case member 46 being omitted. FIG. 7 shows a state viewed from a side where the case bottom wall 51 is positioned in the third direction.

The case peripheral wall 53 includes two pairs of case side walls 55 and 56. The pair of case side walls (first case side walls) 55 face each other with the storage cavity 43 interposed therebetween in the first direction. The pair of case side walls (second case side walls) 56 face each other with the storage cavity 43 interposed therebetween in the second direction. Each of the case side walls 55 extends continuously along the second direction between the case side walls 56. Each of the case side walls 56 extends continuously along the first direction between the case side walls 55.

In the present embodiment including the example of FIGS. 4 to 7, etc., the dimension in the first direction between the pair of case side walls 55 is smaller than each of the dimension in the second direction between the pair of case side walls 56 and the dimension in the third direction between the case bottom wall 51 and the case top wall 52. Therefore, in each of the storage cavity 43 and the case 42, the dimension in the first direction is smaller than the dimension in the second direction and the dimension in the third direction. The dimension in the second direction between the pair of case side walls 56 is larger than the dimension in the third direction between the case bottom wall 51 and the case top wall 52. Therefore, in each of the storage cavity 43 and the case 42, the dimension in the second direction is larger than the dimension in the third direction.

The case 42 includes a partition wall (first partition wall) 57 and a partition wall (second partition wall) 58. In an example of FIGS. 4 to 7, one partition wall 57 is provided, and three partition walls 58 are provided. The partition walls 57 and 58 are each formed by both the first case member 45 and the second case member 46. The partition walls 57 and 58 each extends continuously between the case bottom wall 51 and the case top wall 52 in the third direction. In each of the partition walls 57 and 58, the case members 45 and 46 are brought into contact with each other at or near the central position in the third direction. FIG. 5 shows the partition wall 57 in a state viewed from one side in the first direction.

The partition wall 57 extends along the second direction in the storage cavity 43 and continuously extends between the case side walls 56. In the partition wall 57, a boundary portion between the case members 45 and 46 is formed along the second direction. The partition wall 57 is formed between the case side walls 55 in the first direction, and is formed at or near the center position of the case 42 in the first direction. The partition wall 57 partitions the battery rows 41A and 41B adjacent to each other in the first direction.

Each of the partition walls 58 extends along the first direction in the storage cavity 43 and continuously extends between the case side walls 55. In each of the partition walls 58, a boundary portion between the case member 45 and 46 is formed along the first direction. Further, each of the partition walls 58 is formed between the case side walls 56 in the second direction, and the partition walls 58 are arranged to be apart from each other in the second direction. In each of the battery rows 41A and 41B, a corresponding one of the partition walls 58 partitions the batteries 1 adjacent to each other in the second direction.

Since the partition walls 57 and 58 are formed as described above, eight spaces (rooms) 61 are formed in the storage cavity 43 in the example of FIGS. 4 to 7. The eight spaces 61 are isolated from each other by the partition walls 57 and 58. In each of the spaces 61, a corresponding one of the eight batteries 1 is arranged. In the storage cavity 43, the volumes (areas) of the spaces 61 are equal or approximately equal to each other. The eight spaces 61 have a dimension in the first direction equal or approximately equal to each other, and have a dimension in the second direction equal or approximately equal to each other. The spaces 61 have a dimension in the third direction equal or approximately equal to each other.

FIG. 8 is an enlarged view of range A1 of FIG. 6, and FIG. 9 is an A2-A2 cross section of FIG. 7. As shown in FIGS. 4 to 9, etc., in the case 42, the first case member 45 is fastened to the second case member 46 by screw members 63 and 67 as fastening members, whereby the case members 45 and 46 are coupled to each other. In an example of FIGS. 4 to 9, etc., two screw members 63 and three screw members 67 are provided. Each of the screw members 63 fastens the case members 45 and 46 to each other at an intersection of a corresponding one of the case side walls 56 and the partition wall 57. Each of the screw members 67 fastens the case members 45 and 46 to each other at an intersection of a corresponding one of the partition walls (second partition walls) 58 and the partition wall (first partition wall) 57. Therefore, the screw members 63 and 67 are each arranged at or near the central position of the case 42 in the first direction.

In the first case member 45, recessed portions 62 in a number equal to the number of the screw members 63 are formed, and recessed portions 66 in a number equal to the number of the screw members 67 are formed. In the second case member 46, holes 65 in a number equal to the number of the screw members 63 are formed, and holes 68 in a number equal to the number of the screw members 67 are formed. The recessed portions 62 and the holes 65 are each formed at an intersection of a corresponding one of the case side walls 56 and the partition wall 57. The recessed portions 66 and the holes 68 are each formed at an intersection of a corresponding one of the partition walls (second partition walls) 58 and the partition wall (first partition wall) 57.

The recessed portions 62 and 66 are each recessed from the case bottom wall 51 toward a side where the second case member 46 is positioned in the third direction. The holes 65 and 68 each extend along the third direction from a boundary portion with the first case member 45 in the second case member 46. Each of the recessed portions 62 communicates with a corresponding one of the holes 65. Each of the recessed portions 66 communicates with a corresponding one of the holes 68. The cross-sectional area of each of the holes 65 and 68 perpendicular to or substantially perpendicular to the third direction is smaller than the cross-sectional area of each of the recessed portions 62 and 66 perpendicular to or substantially perpendicular to the third direction.

Each of the screw members 63 and 67 includes a head portion (63A and 67A, respectively), and a male screw portion (63B and 67B, respectively) as an engagement portion. In each of the screw members 63 and 67, the cross-sectional area of the head portion (63A; 67A, respectively) perpendicular to or substantially perpendicular to the axial direction is larger than the cross-sectional area of the male screw portion (63B; 67B, respectively) perpendicular to or substantially perpendicular to the axial direction. Further, in each of the screw members 63 and 67, the cross-sectional area of the head portion (63A; 67A, respectively) perpendicular to or substantially perpendicular to the axial direction is smaller than the cross-sectional area of each of the recessed portions 62 and 66 perpendicular to or substantially perpendicular to the third direction. In each of the screw members 63 and 67, the cross-sectional area of the head portion (63A; 67A, respectively) perpendicular to or substantially perpendicular to the axial direction is larger than the cross-sectional area of each of the holes 65 and 68 perpendicular to or substantially perpendicular to the third direction.

Each of the screw members 63 is inserted into a corresponding one of the recessed portions 62. Each head portion 63A of the screw member 63 comes into contact with a bottom surface of a corresponding one of the recessed portions 62 from the side where the case bottom wall 51 is positioned. A female screw portion (not shown) is formed on an inner peripheral surface of each of the holes 65. Each male screw portion 63B of the screw member 63 is inserted into a corresponding one of the holes 65. Each male screw portion 63B of the screw member 63 is screwed with the female screw portion in a corresponding one of the holes 65. Thereby, each of the screw members 63 fastens the case members 45 and 46 to each other.

Similarly, each of the screw members 67 is inserted into a corresponding one of the recessed portions 66. Each head portion 67A of the screw member 67 comes into contact with a bottom surface of a corresponding one of the recessed portions 66 from a side where the case bottom wall 51 is positioned. A female screw portion (not shown) is formed on an inner peripheral surface of each of the holes 68. Each male screw portion 67B of the screw member 67 is inserted into a corresponding one of the holes 68. Each male screw portion 67B of the screw member 67 is screwed with the female screw portion in a corresponding one of the holes 68. Thereby, each of the screw members 67 fastens the case members 45 and 46 to each other.

As described above, in each of the screw members 63 and 67 as fastening members, the head portion (a corresponding one of respective 63A and 67A) comes into contact with a bottom surface of a corresponding one of the respective recessed portions 62 and 66 from the side where the case bottom wall 51 is positioned. In each of the screw members 63 and 67, an engagement portion such as a male screw portion (a corresponding one of respective 63B and 67B) is inserted into a corresponding one of the respective holes 65 and 68, and engages with the second case member 46 in a corresponding one of the respective holes 65 and 68.

The partition wall (first partition wall) 57 has partition surfaces 57A and 57B. The partition surface (first partition surface) 57A faces one side (arrow X3 side) in the first direction, and the partition surface (second partition surface) 57B faces the side opposite to the partition surface 57A in the first direction. Each of the partition walls (second partition walls) 58 has partition surfaces 58A and 58B. On each of the partition walls 58, the partition surface (third partition surface) 58A faces one side (arrow Y3 side) in the second direction, and the partition surface (fourth partition surfaces) 58B faces the side opposite to the partition surface 58A in the second direction.

A plurality of ribs (first ribs) 71 are formed on each of partition surfaces (surfaces) 57A and 57B of the partition wall 57. On each of the partition surfaces 57A and 57B, each of the ribs 71 protrudes in the first direction. On the partition surface 57A, each of the ribs 71 protrudes to the side (arrow X3 side) toward which the partition surface 57A faces in the first direction. On the partition surface 57B, each of the ribs 71 protrudes to the side (arrow X4 side) toward which the partition surface 57B faces in the first direction. In an example of FIGS. 4 to 9, etc., each of the ribs 71 extends continuously between the case bottom wall 51 and the case top wall 52 in the third direction.

In each of the partition surfaces 57A and 57B, the plurality of ribs 71 are arranged apart from each other in the second direction. In an example of FIGS. 4 to 9, etc., the number of ribs 71 formed on the partition surface (first partition surface) 57A is the same as the number of ribs 71 formed on the partition surface (second partition surface) 57B. Each of the ribs 71 formed on the partition surface 57A does not deviate or rarely deviates from a corresponding one of the ribs 71 formed on the partition surface 57B in the second direction. Therefore, the ribs 71 are arranged symmetrically (plane-symmetrically) or substantially symmetrically (substantially plane-symmetrically) with the partition wall 57 as the center (center plane).

In each of the partition walls 58, a plurality of ribs (second ribs) 72 are formed on each of partition surfaces (surfaces) 58A and 58B. On each of the partition surfaces 58A and 58B of each of the partition walls 58, each of the ribs 72 protrudes in the second direction. On the partition surface 58A of each of the partition walls 58, each of the ribs 72 protrudes to the side (arrow Y3 side) toward which the partition surface 58A faces in the second direction. On the partition surface 58B of each of the partition walls 58, each of the ribs 72 protrudes to the side (arrow Y4 side) toward which the partition surface 58B faces in the second direction. In an example of FIGS. 4 to 9, etc., each of the ribs 72 extends continuously between the case bottom wall 51 and the case top wall 52 in the third direction.

On each of the partition surfaces 58A and 58B of each of the partition walls 58, the plurality of ribs 72 are arranged apart from each other in the first direction. In an example of FIGS. 4 to 9, etc., in each of the partition walls 58, the number of ribs 72 formed on the partition surface (third partition surface) 58A is the same as the number of ribs 72 formed on the partition surface (fourth partition surface) 58B. On each of the partition walls 58, each of the ribs 72 formed on the partition surface 58A does not deviate or rarely deviates from a corresponding one of the ribs 72 formed on the partition surface 58B in the first direction. Therefore, on each of the partition walls 58, the ribs 72 are arranged symmetrically (plane-symmetrically) or substantially symmetrically (substantially plane-symmetrically) with the partition wall (a corresponding one of 58) as the center (center plane).

In an example of FIGS. 4 to 9, etc., on the partition wall 57, three ribs (first ribs) 71 protrude toward each of the spaces 61 (all of the eight spaces 61 in the example of FIGS. 4 to 9) adjacent to the partition wall 57 in the first direction. On each of the partition walls 58, two ribs (second ribs) 72 protrude toward each of the spaces 61 (corresponding four of the eight spaces 61 in the example of FIGS. 4 to 9) adjacent to the partition wall (corresponding one of 58) in the second direction. In an example of FIGS. 4 to 9, etc., three ribs 71 are arranged in each of the eight spaces 61. Two ribs 72 are arranged in each of the four spaces 61 located at both ends in the second direction. Four ribs 72 are arranged in each of the four spaces 61 excluding the spaces 61 located at both ends in the second direction.

Here, any one of the eight batteries 1 is referred to as a battery (first battery) 1α. Further, a battery (second battery) 1β adjacent to the battery 1α in the first direction and a battery (third battery) 1γ adjacent to the battery 1α in the second direction are defined. A battery (fourth battery) 1δ adjacent to the battery 1γ in the first direction and adjacent to the battery 1β in the second direction is defined. In the battery module 40, the partition wall (first partition wall) 57 partitions the batteries 1α and 1β and partitions the batteries 1γ and 1δ in the first direction. A partition wall 58α which is a corresponding one of the partition walls (second partition walls) 58 partitions the battery 1α and the battery 1γ and partitions the battery 1β and the battery 1δ in the second direction. Therefore, the spaces 61 in which the batteries 1α to 1δ are arranged are isolated from each other by the partition wall 57 and 58α. At the intersection of the partition walls 57 and 58α, the case members 45 and 46 are fastened to each other by a corresponding one of the screw members (fastening members) 67.

As described above, the plurality of ribs 71 protrude in the first direction on each of the partition surfaces 57A and 57B of the partition wall 57, and the plurality of ribs 72 protrude in the second direction on each of the partition surfaces 58A and 58B of the partition wall 58α. In each of the spaces 61 in which the batteries 1α to 1δ are housed, a corresponding one or more ribs 71 protruding from the partition wall 57 and a corresponding one or more ribs 72 protruding from the partition wall 58α are arranged. In an example of FIGS. 4 to 9, etc., three ribs (first ribs) 71 protrude from the partition wall 57 toward each of the batteries 1α to 1δ. Two ribs (second ribs) 72 protrude from the partition wall 58α toward each of the batteries 1α to 1δ.

FIG. 10 shows a partial range of the first case member 45 of the battery module 40 of the example shown in FIGS. 4 to 9, etc., and FIG. 11 shows an enlarged view of a range A3 of FIG. 10. FIG. 12 shows a partial range of the first case member 45 of the battery module 40 different from the range shown in FIG. 10, and FIG. 13 shows a range A4 of FIG. 12. As shown in FIGS. 5, 8, 10 to 13, etc., crush ribs 73A and 73B are formed on the first case member 45 in addition to the ribs 71 and 72 described above. Each of the crush ribs 73A and 73B is arranged in the storage cavity 43 of the case 42. In the storage cavity 43, each of the crush ribs 73A and 73B is arranged at an end portion on the side where the case bottom wall 51 is positioned in the third direction. Each of the crush ribs 73A and 73B extends from the case bottom wall 51 along the third direction toward the side where the second case member 46 (case top wall 52) is positioned.

In an example of FIGS. 4 to 13, etc., a plurality of crush ribs 73A are formed on the inner surface of each of the case side walls 55. On the inner surface of each of the case side walls 55, each of the crush ribs 73A protrudes inward in the first direction. Further, a plurality of crush ribs 73A are formed on each of the partition surfaces 57A and 57B of the partition wall 57. On each of the partition surfaces 57A and 57B of the partition wall 57, each of the crush ribs 73A further protrudes in the first direction from a corresponding one of the ribs 71. On the partition surface 57A, each of the crush ribs 73A protrudes from a corresponding one of the ribs 71 to a side (arrow X3 side) toward which the partition surface 57A faces in the first direction. On the partition surface 57B, each of the crush ribs 73A protrudes from a corresponding one of the ribs 71 to a side (arrow X4 side) toward which the partition surface 57B faces in the first direction.

On each of the partition walls 58 as well, a plurality of crush ribs 73A are formed on each of the partition surfaces (surfaces) 58A and 58B. On each of the partition surfaces 58A and 58B of each of the partition walls 58, each of the crush ribs 73A further protrudes in the second direction from a corresponding one of the ribs 72. On the partition surface 58A of each of the partition walls 58, each of the crush ribs 73A protrudes from a corresponding one of the ribs 72 to a side (arrow Y3 side) toward which the partition surface 58A faces in the second direction. On the partition surface 58B of each of the partition walls 58, each of the crush ribs 73A protrudes from a corresponding one of the ribs 72 to a side (arrow Y4 side) toward which the partition surface 58B faces in the second direction.

In an example of FIGS. 4 to 13, etc., a plurality of crush ribs 73B are formed on each of the partition surfaces 57A and 57B of the partition wall 57. On each of the partition surfaces 57A and 57B of the partition wall 57, each of the crush ribs 73B protrudes in the first direction. On the partition surface 57A, each of the crush ribs 73B protrudes to a side (arrow X3 side) toward which the partition surface 57A faces in the first direction. On the partition surface 57B, each of the crush ribs 73B protrudes to a side (arrow X4 side) toward which the partition surface 57B faces in the first direction. The amount of protrusion of each of the crush ribs 73A from the case side wall 55 and the corresponding one of the ribs 71 and 72 is smaller than the amount of protrusion of each of the crush ribs 73B from the partition wall 57.

In an example of FIGS. 4 to 13, etc., on the partition wall 57, three crush ribs 73A and two crush ribs 73B protrude toward each of the spaces 61 (all of the eight spaces 61 in the example of FIGS. 4 to 13) adjacent to the partition wall 57 in the first direction. On each of the partition walls 58, one crush rib 73A protrudes toward each of the spaces 61 (corresponding four of the eight spaces 61 in the example of FIGS. 4 to 13) adjacent to the partition wall (corresponding one of 58) in the second direction. On each of the pair of case side walls 55, five crush ribs 73A protrude toward each of the spaces 61 (corresponding four of the eight spaces 61 in the example of FIGS. 4 to 13) adjacent to the side wall (corresponding one of 55) in the first direction.

In an example of FIGS. 4 to 13, etc., two crush ribs 73B are arranged in each of the eight spaces 61. Nine crush ribs 73A are arranged in each of the four spaces 61 arranged at both ends in the second direction. Ten crush ribs 73A are arranged in each of the four spaces 61 excluding the spaces 61 positioned at both ends in the second direction. In an example of FIGS. 4 to 13, etc., three crush ribs 73A (ribs 71)

and two crush ribs 73B are alternately arranged in the second direction at a region along the partition wall 57 of each of the spaces 61.

Each of the crush ribs 73A and 73B includes an inclined surface 77 at an end portion on the side where the case bottom wall 51 is positioned in the third direction. In each of the crush ribs 73A and 73B, the inclined surface 77 is inclined such that the amount of protrusion increases toward the case bottom wall 51. That is, in the inclined surface 77 of each of the crush ribs 73A and 73B, as a distance from the case bottom wall 51 increases, a distance from a root position of the protruding portion decreases.

FIG. 14 shows a partial range of the second case member 46 of the battery module 40 of the example shown in FIGS. 4 to 9, etc. As shown in FIGS. 5 and 14, etc., a plurality of crush ribs 75 are formed on the second case member 46 in addition to the above-described ribs 71 and 72. Each of the crush ribs 75 is arranged in the storage cavity 43 of the case 42. In the storage cavity 43, each of the crush ribs 75 is arranged at an end portion on the side where the case top wall 52 is positioned in the third direction. Each of the crush ribs 75 extends from the case top wall 52 along the third direction toward the side where the first case member 45 (case bottom wall 51) is positioned. Thus, each of the crush ribs 75 is arranged away from each of the crush ribs 73A and 73B in the third direction.

In the example shown in FIGS. 4 to 14, etc., a plurality of crush ribs 75 are formed on the inner surface of each of the case side walls 55. On the inner surface of each of the case side walls 55, each of the crush ribs 75 protrudes inward in the first direction. Further, a plurality of crush ribs 75 are formed on each of the partition surfaces 57A and 57B of the partition wall 57. On each of the partition surfaces 57A and 57B of the partition wall 57, each of the crush ribs 75 further protrudes in the first direction from a corresponding one of the ribs 71. On the partition surface 57A, each of the crush ribs 75 protrudes from a corresponding one of the ribs 71 to a side (arrow X3 side) toward which the partition surface 57A faces in the first direction. On the partition surface 57B, each of the crush ribs 75 protrudes from a corresponding one of the ribs 71 to a side (arrow X4 side) toward which the partition surface 57B faces in the first direction.

In an example of FIGS. 4 to 14, etc., on the partition wall 57, three crush ribs 75 protrude toward each of the spaces 61 (all of the eight spaces 61 in the example of FIGS. 4 to 14) adjacent to the partition wall 57 in the first direction. In each of the pair of case side walls 55, three crush ribs 75 protrude toward each of the spaces 61 (corresponding four of the eight spaces 61 in the example of FIGS. 4 to 14) adjacent to the side wall (corresponding one of 55) in the first direction. In an example of FIGS. 4 to 14, etc., six crush ribs 75 are arranged in each of the eight spaces 61.

FIG. 15 shows one of the eight spaces 61. FIG. 15 shows a cross section passing through one of the crush ribs 73A and one of the crush ribs 73B in the space 61. As shown in FIG. 15, etc., in each of the spaces 61, each of the crush ribs 73A and 73B is pressed in the first direction or the second direction by the peripheral wall 12 of the corresponding one of the batteries 1. In each of the spaces 61, each of the crush ribs 73A and 73B is pressed toward the side where the case bottom wall 51 is positioned in the third direction by the bottom wall 11 of the corresponding one of the batteries 1. Therefore, in each of the spaces 61, each of the crush ribs 73A and 73B is crushed by pressing from the corresponding one of the batteries 1. Further, in each of the spaces 61, each of the crush ribs 75 is pressed in the first direction or the second direction by the peripheral wall 12 of the corresponding one of the batteries 1. Therefore, in each of the spaces 61, each of the crush ribs 75 is crushed by pressing from the corresponding one of the batteries 1.

In each of the spaces 61, the inclined surface 77 of each of the crush ribs 73A and 73B presses a corresponding one of the batteries 1 toward the side where the case top wall 52 is positioned in the third direction. Therefore, each of the eight batteries 1 is pressed toward the side where the case top wall 52 is positioned in the third direction by the inclined surface 77 of each of the crush ribs 73A and 73B in the corresponding one of the spaces 61. Each of the batteries 1 comes into contact with the inner surface of the case top wall 52 by being pressed by the crush ribs 73A and 73B. In each of the batteries 1, the pair of electrode terminals 27 protrude outward in the third direction with respect to the inner surface of the case top wall 52. In an example, the case top wall 52 is formed with one or more holes (not shown) that allow the outside of the case 42 to communicate with the storage cavity 43. Each of the electrode terminals 27 of each of the batteries 1 is exposed to the outside of the case 42 through any of the holes formed on the case top wall 52.

In the battery module 40, one or more bus bars (not shown) are used to electrically connect the plurality of batteries 1 to each other. The bus bar is made of an electro-conductive material such as a metal. In the battery module 40, a plurality of batteries 1 may be electrically connected in series, or a plurality of batteries 1 may be electrically connected in parallel. The battery module 40 may be provided with both a series connection in which the batteries 1 are connected in series and a parallel connection in which the batteries 1 are connected in parallel. When two batteries 1 are electrically connected using one bus bar, the bus bar connects a positive electrode terminal of one of the two batteries 1 and a negative electrode terminal of the other of the two batteries 1. When two or more batteries 1 are electrically connected in parallel using two bus bars, one of the two bus bars connects the positive electrode terminals of the two or more batteries 1. The other of the two bus bars connects the negative electrode terminals of two or more batteries 1.

In the battery module 40 of the present embodiment, the screw members 63 and 67 as fastening members fasten the case members 45 and 46. By fastening with the screw members 63 and 67, the plurality of case members 45 and 46 forming the case 42 are coupled to each other. Therefore, the case member 45 and 46 are coupled without using an adhesive or the like.

In the battery module 40, each of the screw members 67 fastens the case members 45 and 46 to each other at an intersection of a corresponding one of the partition walls (second partition walls) 58 and the partition wall (first partition wall) 57. Therefore, each of the screw members 67 fastens the case member 45 and 46 at a portion between the case side walls 55 in the first direction and between the case side walls 56 in the second direction. That is, each of the screw members 67 fastens the case member 45 and 46 at a portion on the inner peripheral side with respect to the case peripheral wall 53. By fastening the case members 45 and 46 at a portion on the inner peripheral side with respect to the case peripheral wall 53, the plurality of case members 45 and 46 forming the case 42 are firmly coupled to each other.

In the battery module 40, the second number, which is the number of batteries 1 arrayed in each of the battery rows (41A, 41B), is larger than the first number, which is the number of battery rows (41A, 41B) formed. In the battery module 40, the dimension in the second direction is larger than each of the dimension in the first direction and the dimension in the third direction. In the battery module 40, as described above, the case members 45 and 46 are fastened by the screw members 67 at one or more positions between the case side walls 56 in the second direction. Therefore, even in the battery module 40 with the case 42 having a large dimension in the second direction, the case members 45 and 46 are firmly coupled to each other. Firmly coupling the case members 45 and 46 ensures the strength of the case 42 even for the battery module 40 with the case 42 having a large dimension in the second direction.

In the battery module 40, a plurality of ribs (first ribs) 71 protruding in the first direction are provided on each of the partition surfaces 57A and 57B of the partition wall 57. A plurality of ribs (second ribs) 72 protruding in the second direction are provided on each of the partition surfaces 58A and 58B of each of the partition walls 58. In each of the spaces 61, movement of a corresponding one of the batteries 1 in the first direction is restricted by the ribs 71. Similarly, in each of the spaces 61, movement of a corresponding one of the batteries 1 in the second direction is restricted by the ribs 72. Since movement of each of the batteries 1 is restricted by the ribs 71 and 72 as described above, each of the batteries 1 is firmly installed in a corresponding one of the spaces 61.

The ribs 71 are arranged symmetrically (plane-symmetrically) or substantially symmetrically (substantially plane-symmetrically) with the partition wall 57 as the center (center plane). On each of the partition walls 58, the ribs 72 are arranged symmetrically (plane-symmetrically) or substantially symmetrically (substantially plane-symmetrically) with the partition wall (a corresponding one of 58) as the center (center plane). Therefore, a force is more directly applied to each of the ribs 71 and 72 from the battery 1 adjacent to the rib (corresponding one of 71 and 72). Thus, each of the batteries 1 can be more reliably fixed (installed).

One or more crush ribs 73A, 73B, and 75 are arranged in each of the spaces 61. In each of the spaces 61, each of the crush ribs 73A, 73B, and 75 is crushed by the pressing from a corresponding one of the batteries 1. Since the crush ribs 73A, 73B, and 75 are crushed as described above, in each of the spaces 61, movement of the corresponding one of the batteries 1 in the first direction and the second direction is more reliably restricted. Therefore, each of the batteries 1 is more firmly installed in the corresponding one of the spaces 61.

In the battery module 40, since each of the batteries 1 is installed as described above, it is not necessary to bond the batteries 1 to the case 42 using an adhesive or the like. That is, each of the batteries 1 is firmly installed in a corresponding one of the spaces 61 without using an adhesive or the like.

In the battery module 40, as described above, the movement of each of the batteries 1 in the first direction is restricted by the ribs 71. Therefore, movement of each of the batteries 1 in the first direction is restricted without increasing the thickness (dimension in the first direction) of the partition wall 57. Since the thickness of the partition wall 57 is not increased, the weight of the case 42 is reduced, and the weight of the battery module 40 is reduced.

In the battery module 40, as described above, movement of each of the batteries 1 in the second direction is restricted by the ribs 72. Therefore, movement of each of the batteries 1 in the second direction is restricted without increasing the thickness (dimension in the second direction) of each of the partition walls 58. Since the thickness of each of the partition walls 58 is not increased, the weight of the case 42 is reduced, and the weight of the battery module 40 is reduced.

In the battery module 40, each of the batteries 1 comes into contact with the inner surface of the case top wall 52 by the pressing from the crush ribs 73A and 73B. In each of the batteries 1, the pair of electrode terminals 27 protrude outward in the third direction with respect to the inner surface of the case top wall 52. That is, the electrode terminals 27 of each of the batteries 1 protrude from the inner surface of the case top wall 52. The lid member 6 of each of the batteries 1 comes into contact with the inner surface of the case top wall 52, and the position of the electrode terminals 27 of each of the batteries 1 in the third direction is fixed. Accordingly, a space is not formed between each of the electrode terminals 27 and the bus bar (not shown), and the bus bar can be easily brought into contact with each of the electrode terminals 27. This improves the workability of the operation of electrically connecting the plurality of batteries 1 using the bus bars during the manufacture, etc. of the battery module 40.

(Modifications)

The number of the ribs 71 provided on the partition wall 57 and the number of the ribs 72 provided on each of the partition walls 58 are not limited to those in the embodiment described above. In a modification, one or more ribs 71 protrude from the partition wall 57 toward each of the batteries 1, and one or more ribs 72 protrude from a corresponding one of the partition walls 58 toward each of the batteries 1. In this case also, movement of each of the batteries 1 in the first direction is restricted by the ribs 71, and movement of each of the batteries 1 in the second direction is restricted by the ribs 72. Further, with the ribs 71 provided, the thickness of the partition wall 57 is not increased, and with the ribs 72 provided, the thickness of each of the partition walls 58 is not increased. Therefore, the weight of the case 42 is reduced, and the weight of the battery module 40 is reduced, as in the above-described embodiment, etc.

In a modification, a rib (first rib) 71 is formed on the partition wall (first partition wall) 57, but a rib (second rib) 72 is not formed on each of the partition walls (second partition walls) 58. In this case, each of the partition walls 58 is formed thicker than when the rib 72 is provided. Movement of each the batteries 1 in the second direction is restricted by corresponding one or two of the partition walls 58. In this modification as well, since the ribs 71 are provided, the thickness of the partition wall 57 is not increased. Therefore, in this modification also, the weight of the case 42 is reduced, and the weight of the battery module 40 is reduced.

In another modification, a rib (second rib) 72 is formed on each of the partition wall (second partition wall) 58, but a rib (first rib) 71 is not formed on the partition wall (first partition wall) 57. In this case, the partition wall 57 is formed thicker than when the rib 71 is provided. Movement of each of the batteries 1 in the first direction is restricted by the partition wall 57. In this modification as well, since the rib 72 is provided, the thickness of each of the partition walls 58 is not increased. Therefore, in this modification also, the weight of the case 42 is reduced, and the weight of the battery module 40 is reduced.

The number of crush ribs 73A and 73B formed on the case 42 and the number of crush ribs 75 formed on the case 42 are not limited to those in the above-described embodiment. In a modification, one or more crush ribs 73A or 73B are arranged in each of the spaces 61. In this modification as well, each of the batteries 1 comes into contact with the inner surface of the case top wall 52 by being pressed by the corresponding one of the crush ribs 73A and 73B in the corresponding one of the spaces 61. In each of the batteries 1, the pair of electrode terminals 27 protrude outward in the third direction with respect to the inner surface of the case top wall 52.

In a modification, the crush rib 75 may not be provided. In another modification, the crush ribs 73A and 73B may not be provided. However, in these modifications as well, at least one of a rib (first rib) 71 protruding from the partition wall (first partition wall) 57 and a rib (second rib) 72 protruding from each of the partition walls (second partition walls) 58 is provided.

Further, the number of batteries 1 included in the battery module 40 is not limited to that in the above-described embodiment, etc. In any case, the battery module 40 includes four or more batteries 1 including batteries 1α to 1δ. Similarly to the above-described embodiment, etc., the battery (second battery) 1β is adjacent to the battery (first battery) 1α in the first direction, and the battery (third battery) 1γ is adjacent to the battery 1α in the second direction. The battery (fourth battery) 1δ is adjacent to the battery 1γ in the first direction, and adjacent to the battery 1β in the second direction. In either case, the partition wall (first partition wall) 57 partitions the battery 1α and the battery 1β and partitions the battery 1γ and the battery 1δ in the first direction, and the partition wall (second partition wall) 58 partitions the battery 1α and the battery 1γ and partition the battery 1β and the battery 1δ in the second direction. At the intersection of the partition walls 57 and 58, the first case member 45 is fastened to the second case member 46 by a fastening member such as the screw member 67. The case 42 is provided with at least one of the rib (first rib) 71 protruding in the first direction on the surface of the partition wall 57 and the rib (second rib) 72 protruding in the second direction on the surface of the partition wall 58.

In the case where the batteries 1α to 1δ are provided as described above, in the battery module 40, the batteries 1α and 1γ form a battery row (first battery row) 41A in which batteries 1 are arrayed along the second direction. The batteries 1β to 1δ form a battery row (second battery row) 41B in which batteries 1 are arrayed along the second direction. The battery rows 41A and 41B are adjacent to each other in the first direction.

In an example, four or more batteries 1 including the batteries 1α to 1δ form the first number of battery rows including the battery rows 41A and 41B. In each of the first number of battery rows including the battery rows 41A and 41B, the second number of batteries 1 larger than the first number are arrayed along the second direction. In this case, in the battery module 40, the dimension in the second direction is larger than each of the dimension in the first direction and the dimension in the third direction.

[Battery Pack]

Next, a description will be given of a battery pack in which the battery module according to the above-described embodiment, etc. is used. FIG. 16 shows an example of a battery pack 80 in which the battery module 40 of the embodiment shown in FIGS. 4 to 15 is used. In an example of FIG. 16, etc., in the battery module 40, a plurality of batteries 1 are electrically connected in series. The batteries 1 are electrically connected to each other via the bus bar, etc. described above. In another example, in the battery module 40, a plurality of batteries 1 may be electrically connected in parallel. In another example, the battery module 40 may be provided with both a series connection in which the batteries 1 are connected in series and a parallel connection in which the batteries 1 are connected in parallel.

In the battery module 40 of the battery pack 80, a positive electrode terminal (a corresponding one of 27) of a corresponding one of the plurality of batteries 1 is connected to a positive electrode-side module terminal 91 via a positive electrode side lead 93, etc. In corresponding one of the batteries 1 other than the battery 1 to which the positive electrode side lead 93 is connected, a negative electrode terminal (a corresponding one of 27) is connected to a negative electrode-side module terminal 92 via a negative electrode-side lead 94.

The battery pack 80 is provided with a printed wiring board 81. On the printed wiring board 81, a protection circuit 82, a thermistor 83 as a temperature detector, and an external terminal 85 for energization are mounted. In the battery pack 80, an insulating member (not shown) prevents unnecessary connection between an electrical path on the printed wiring board 81 and a wiring of the battery module 40. The positive electrode-side module terminal 91 is connected to the protection circuit 82 via a wiring 86 or the like formed on the printed wiring board 81, and the negative electrode-side module terminal 92 is connected to the protection circuit 82 via a wiring 87 or the like formed on the printed wiring board 81.

The thermistor 83 as a temperature detector detects a temperature of each of the plurality of batteries 1 forming the battery module 40. The thermistor 83 outputs a detection signal for the temperature to the protection circuit 82.

The battery pack 80 has a current detection function and a voltage detection function. In the battery pack 80, an input current to the battery module 40 and an output current from the battery module 40 may be detected, and a current flowing through any of the batteries 1 forming the battery module 40 may be detected. In the battery pack 80, a voltage of each of the batteries 1 may be detected in the battery module 40, or a voltage applied to the entire battery module 40 may be detected. In the battery pack 80, the battery module 40 and the protection circuit 82 are connected via the wiring 84. A detection signal for the current and a detection signal for the voltage are output to the protection circuit 82 via the wiring 84.

In an example, instead of detecting a voltage of each of the batteries 1, a positive electrode electric potential or a negative electrode electric potential is detected for each of the batteries 1 forming the battery module 40. In this case, the battery module 40 is provided with a lithium electrode or the like as a reference electrode. Then, the positive electrode electric potential or the negative electrode electric potential of each of the batteries 1 is detected with reference to an electric potential at the reference electrode.

The external terminal 85 is connected to a device outside the battery pack 80. The external terminal 85 is used to output a current from the battery module 40 to the outside and/or input a current to the battery module 40. When the battery module 40 of the battery pack 80 is used as a power source, a current is supplied to the outside of the battery pack 80 through the energization external terminal 85. When the battery module 40 is charged, a charging current is supplied to the battery module 40 through the energization external terminal 85. The charging current of the battery module 40 includes, for example, regenerative energy of power of a vehicle or the like. The protection circuit 82 can be connected to the external terminal 85 through a positive wiring 88 and a negative wiring 89.

The protection circuit 82 has a function of blocking electrical connection between the battery module 40 and the external terminal 85. The protection circuit 82 is provided with a relay, a fuse, or the like, as a connection blocking unit. The protection circuit 82 has a function of controlling charge and discharge of the battery module 40. The protection circuit 82 controls charging and discharging of the battery module 40 based on a detection result of any one or more of the above-described current, voltage, temperature, and the like.

For example, when the temperature detected by the thermistor 83 becomes equal to or higher than a predetermined temperature, the protection circuit 82 determines that a predetermined condition is satisfied. When any one or more of overcharge, overdischarge, overcurrent, and the like are detected in the battery module 40, the protection circuit 82 determines that the battery module 40 satisfies a predetermined condition. When it is determined that the battery module 40 satisfies the above-described predetermined condition, the protection circuit 82 can block the conduction between the protection circuit 82 and the energization external terminal 85. When the conduction between the protection circuit 82 and the energization external terminal 85 is blocked, the output of the current from the battery module 40 to the outside and the input of the current to the battery module 40 are stopped. This effectively prevents continuous occurrence of an overcurrent or the like in the battery module 40.

In an example, a circuit formed in a device using the battery pack 80 (battery module 40) as a power supply may be used as a protection circuit. In the battery pack 80, a plurality of battery modules 40 may be provided, and the battery modules 40 may be electrically connected in series and/or in parallel.

[Use of Battery Pack]

The configuration and the like of the battery pack 80 including the battery module 40 described above are appropriately changed depending on use. The battery pack 80 is preferably used in an apparatus or the like that is required to be charged and discharged with a large current. Specific use of the battery pack 80 includes a power supply of a digital camera, an on-vehicle power supply of a vehicle, and a stationary power supply. In this case, examples of the vehicle on which the battery pack 80 including the battery module 40 is mounted include a two- or four-wheeled hybrid electric vehicle, a two- or four-wheeled electric vehicle, a power-assisted bicycle, and a railway vehicle. The vehicle on which the battery pack 80 is mounted includes an automated guided vehicle (AGV) used in a factory or the like.

FIG. 17 shows an example of application of the above-described battery pack 80 to a vehicle 100. In the example shown in FIG. 17, the vehicle 100 includes a vehicle body 101 and the battery pack 80. In the example shown in FIG. 17, the vehicle 100 is a four-wheeled automobile. A plurality of battery packs 80 may be mounted on the vehicle 100.

In the example of FIG. 17, the battery pack 80 is mounted in an engine room located in front of the vehicle body 101. The battery pack 80 may be mounted, for example, behind the vehicle body 101 or under the seat. In particular, the battery pack 80 including the above-described battery module 40 can be arranged even in a narrow space under the seat. As described above, the battery pack 80 can be used as a power source of the vehicle 100. Further, the battery pack 80 can recover regenerative energy of power of the vehicle 100.

According to at least one of the embodiments and examples, a first partition wall partitions a first battery and a second battery and partitions a third battery and a fourth battery in a first direction, and a second partition wall partitions the first battery and the third battery and partitions the second battery and the fourth battery in a second direction. A fastening member fastens a first case member to a second case member at an intersection of the first partition wall and the second partition wall. A case includes at least one of a first rib protruding in the first direction on a surface of the first partition wall and a second rib protruding in the second direction on a surface of the second partition wall. Accordingly, it is possible to provide a battery module in which a plurality of case members forming a case are firmly coupled to each other, each of a plurality of batteries is firmly installed inside the case, and a weight reduction is realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery module, comprising:
   four or more battery cells; and
   a case in which the four or more battery cells are housed;
   wherein
   the four or more batteries include a first battery cell, a second battery cell adjacent to the first battery cell in a first direction, a third battery cell adjacent to the first battery cell in a second direction intersecting the first direction, and a fourth battery cell adjacent to the third battery cell in the first direction and adjacent to the second battery in the second direction,
   the case includes a first partition wall that is formed in such a manner that the first partition passes through a region between the first battery cell and the second battery cell and a region between the third battery cell and the fourth battery cell and that partitions the first battery cell and the second battery cell and partitions the third battery cell and the fourth battery cell, and a second partition wall that is formed in such a manner that the second partition passes through a region between the first battery cell and the third battery cell and a region between the second battery cell and the fourth battery cell and that partitions the first battery and the third battery cell and partitions the second battery cell and the fourth battery cell,
   the case includes a first case member, a second case member coupled to the first case member from one side in a third direction intersecting both the first direction and the second direction, and a fastening member fastening the first case member to the second case member at an intersection of the first partition wall and the second partition wall, and
   the case includes at least one of a first rib protruding in the first direction on a surface of the first partition wall and a second rib protruding in the second direction on a surface of the second partition wall,
   each of the four or more battery cells is partitioned relative to one or more adjacent battery cells in the first direction by the first partition wall, and is partitioned relative to one or more adjacent battery cells in the second direction by the second partition wall, each of the four or more batteries includes an electrode group, and a container in which the electrode group is housed in an inner cavity, the container of each of the four or more batteries has a smaller dimension in a depth direction than each of a dimension in a lateral direction intersecting the depth direction and a dimension in a height direction intersecting both the depth direction and the lateral direction, and each of the four or more batteries is arranged in a state where the depth direction is along the first direction and the lateral direction is along the second direction, the container of each of the four or more batteries includes a bottom wall positioned on one side in the height direction with respect to the inner cavity, a peripheral wall surrounding an outer peripheral side of the inner cavity, and a lid member attached to the peripheral wall from a side opposite to the bottom wall in the height direction, each of the four or more batteries includes an electrode terminal attached to an outer surface of the lid member, the second case member includes a case top wall, the outer surface of the lid member of each of the four or more batteries faces a side where the case top wall is positioned in the third direction, the case includes a crush rib that presses each of the four or more batteries toward a side where the case top wall is positioned in the third direction, and in each of the four or more batteries, by pressing from the crush rib, the outer surface of the lid member comes into contact with an inner surface of the case top wall, and the electrode terminal protrudes outward in the third direction with respect to the inner surface of the case top wall.

2. The battery module according to claim 1, wherein the battery module is at least one of:

a battery module in which four or more of the first ribs are provided, and one or more of the first ribs protrude from the first partition wall toward each of the first battery to the fourth battery, and a battery module in which four or more of the second ribs are provided, and one or more of the second ribs protrude from the second partition wall toward each of the first battery to the fourth battery.

3. The battery module according to claim 1, wherein the first battery and the third battery form a first battery row in which a plurality of batteries are arrayed along the second direction, the second battery and the fourth battery form a second battery row in which a plurality of batteries are arrayed along the second direction, and the first battery row is adjacent to the second battery row in the first direction.

4. The battery module according to claim 3, wherein the four or more batteries form a first number of battery rows including the first battery row and the second battery row, and in each of the battery rows including the first battery row and the second battery row, a second number of batteries larger than the first number are arrayed along the second direction.

5. The battery module according to claim 1, wherein the case has a larger dimension in the second direction than each of a dimension in the first direction and a dimension in the third direction.

6. The battery module according to claim 1, wherein the first case member includes a case bottom wall, and a recessed portion recessed from the case bottom wall toward a side where the second case member is positioned in the third direction at the intersection of the first partition wall and the second partition wall, the second case member is provided with a hole formed along the third direction, the hole communicating with the recessed portion at the intersection of the first partition wall and the second partition wall, and the fastening member includes a head portion that comes into contact with a bottom surface of the recessed portion from a side where the case bottom wall is positioned, and an engagement portion that is inserted into the hole of the second case member and engages with the second case member in the hole.

7. A battery pack comprising the battery module according to claim 1.

8. A vehicle comprising the battery pack of claim 7.

* * * * *